US012629596B2

(12) United States Patent (10) Patent No.: US 12,629,596 B2
Kuang et al. (45) Date of Patent: May 19, 2026

(54) PROP GENERATION METHOD, PROP GENERATION APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Ye Kuang, Shenzhen (CN); Zhixin Gui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 225 days.

(21) Appl. No.: 18/353,878

(22) Filed: Jul. 17, 2023

(65) Prior Publication Data

US 2023/0356083 A1 Nov. 9, 2023

Related U.S. Application Data

(63) Continuation of application No. PCT/CN2022/132199, filed on Nov. 16, 2022.

(30) Foreign Application Priority Data

Jan. 29, 2022 (CN) ........................ 202210112121.X

(51) Int. Cl.
*A63F 13/63* (2014.01)
*A63F 13/52* (2014.01)
(Continued)

(52) U.S. Cl.
CPC .............. *A63F 13/55* (2014.09); *A63F 13/52* (2014.09); *A63F 13/822* (2014.09); *A63F 2300/807* (2013.01)

(58) Field of Classification Search
CPC .... A63F 13/426; A63F 13/533; A63F 13/537; A63F 13/5375; A63F 13/60; A63F 13/63;
(Continued)

(56) References Cited

U.S. PATENT DOCUMENTS

2009/0241038 A1 9/2009 Izuno et al.
2023/0044770 A1 2/2023 Fu et al.
(Continued)

FOREIGN PATENT DOCUMENTS

CN 102201026 A 9/2011
CN 110064204 A 7/2019
(Continued)

OTHER PUBLICATIONS

The World Intellectual Property Organization (WIPO) International Search Report for PCT/CN2022/132199 Feb. 10, 2023 7 Pages (including translation).

(Continued)

*Primary Examiner* — Lawrence S Galka
(74) *Attorney, Agent, or Firm* — Anova Law Group, PLLC

(57) ABSTRACT

A prop generation method includes: displaying a prop list of a target account in a display interface displaying a virtual game scene, the prop list including prop icons of props obtained by the target account; displaying a preview prop icon of a merge prop matched with the first prop in a preview state in response to a drag operation performed on a prop icon of a first prop in the prop list, the merge prop being obtained by merging the first prop with a second prop in a candidate merging state; determining a target merge prop matched with an operation trajectory endpoint of the drag operation, displaying generation progress information for merging the target merge prop; and canceling the generation of the target merge prop in response to a cancel operation (Continued)

triggered for the generation progress information and that the generation progress information indicates that the generation is not completed.

20 Claims, 14 Drawing Sheets

(51) Int. Cl.
  *A63F 13/55* (2014.01)
  *A63F 13/822* (2014.01)
(58) Field of Classification Search
  CPC ........ A63F 13/69; A63F 13/79; A63F 13/822; A63F 13/825; A63F 2300/308; A63F 2300/6018; A63F 2300/609; A63F 2300/807
  See application file for complete search history.

(56) References Cited

U.S. PATENT DOCUMENTS

| | | |
|---|---|---|
| 2023/0055890 A1 | 2/2023 | Liu et al. |
| 2023/0072503 A1 | 3/2023 | Huang |
| 2023/0101933 A1* | 3/2023 | Lin .......................... A63F 13/63 |
| | | 463/31 |
| 2023/0218997 A1 | 7/2023 | Deng et al. |
| 2023/0233934 A1 | 7/2023 | Yamanokuchi et al. |
| 2023/0356083 A1 | 11/2023 | Kuang et al. |

FOREIGN PATENT DOCUMENTS

| | | | | |
|---|---|---|---|---|
| CN | 112221126 A | 1/2021 | | |
| CN | 112402950 A | 2/2021 | | |
| CN | 112675544 A | 4/2021 | | |
| CN | 113144597 A | 7/2021 | | |
| CN | 113509714 A | 10/2021 | | |
| CN | 113730906 A | * | 12/2021 | ............. A63F 13/52 |
| CN | 114558323 A | 5/2022 | | |
| JP | 2014184081 A | 10/2014 | | |
| JP | 2015217021 A | 12/2015 | | |
| JP | 2018051222 A | 4/2018 | | |
| JP | 2020162770 A | 10/2020 | | |
| WO | 2020134059 A1 | 7/2020 | | |

OTHER PUBLICATIONS

China National Intellectual Property Administration (CNIPA) Office Action 1 for Application No. 202210112121.X Feb. 22, 2025 12 Pages (including translation).
Super simple survival 1: Super simple survival where you can create artifacts using only soil! How to play this? ! , https://www.bilibili.com/video/BV1H5411g7Y1/?spm_id_from=333.337.search-card.all.click&vd_source=5198b31b0b2f6afd29bbfaa90e293eb9, May 29, 2021 (May 29, 2021).
The Japan Patent Office (JPO) Notice of Reasons for Refusal for Application No. 2024-529890 Apr. 30, 2025 15 Pages (including translation).
[Minecraft] Unakiri UltimateAlchemy Part 3/Automatic Warehouse Introduction, YouTube [on line] [video], Apr. 14, 2019, [Searched on Apr. 21, 2025], https://www.youtube.comwatch?v=EAQc8pyrGWk&t=278s, see mainly 4:42 to 4:45.
[MHWI] [HowTo] Basics of weapon production and modification !! [Monster Hunter World: Isborn], YouTube [online] [video], Oct. 17, 2019, [Checked Apr. 21, 2025 Search], https://www.youtube.com/watch?v=l1mskD6bHHA, mainly from 2:33 to 3:03.
Korean Intellectual Property Office (KIPO) Office Action 1 for Application No. 2023-7010812 Aug. 13, 2025 18 Pages (including translation).
[Maple No-Capital Tips] What is Equipment Synthesis? (Jan. 9, 2021).

* cited by examiner

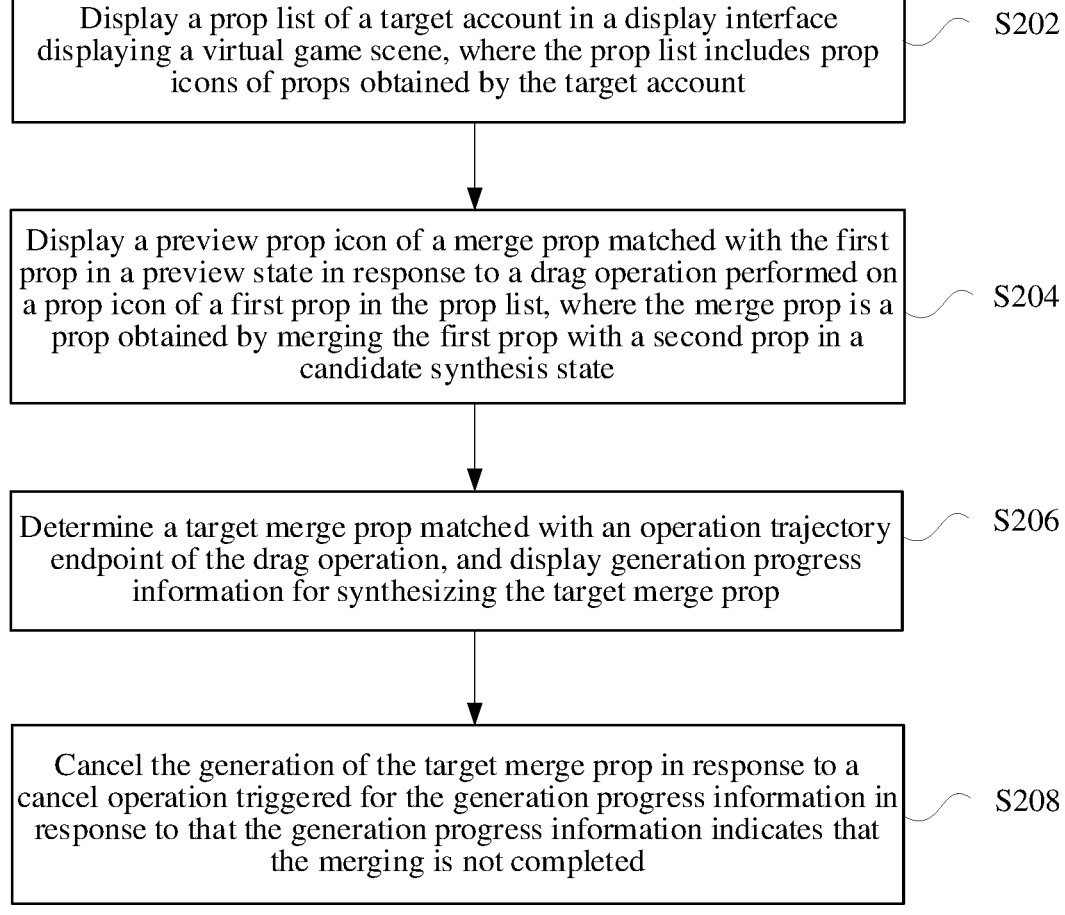

Display a prop list of a target account in a display interface displaying a virtual game scene, where the prop list includes prop icons of props obtained by the target account  ⟶ S202

Display a preview prop icon of a merge prop matched with the first prop in a preview state in response to a drag operation performed on a prop icon of a first prop in the prop list, where the merge prop is a prop obtained by merging the first prop with a second prop in a candidate synthesis state  ⟶ S204

Determine a target merge prop matched with an operation trajectory endpoint of the drag operation, and display generation progress information for synthesizing the target merge prop  ⟶ S206

Cancel the generation of the target merge prop in response to a cancel operation triggered for the generation progress information in response to that the generation progress information indicates that the merging is not completed  ⟶ S208

FIG. 2

PROP GENERATION METHOD, PROP GENERATION APPARATUS, STORAGE MEDIUM, AND ELECTRONIC DEVICE

CROSS-REFERENCES TO RELATED APPLICATIONS

This application is a continuation application of PCT Patent Application No. PCT/CN2022/132199, filed on Nov. 16, 2022, which claims priority to Chinese Patent Application No. 202210112121.X, entitled "PROP GENERATION METHOD, PROP GENERATION APPARATUS, STORAGE MEDIUM, AND ELECTRONIC DEVICE" filed with the Chinese Patent Office on Jan. 29, 2022, the entire contents of both of which are incorporated herein by reference.

FIELD OF THE TECHNOLOGY

The present disclosure relates to the field of computers, in particular to a prop generation method, a prop generation apparatus, a storage medium, and an electronic device.

BACKGROUND

In many tactical and strategic game applications, a player usually deploys virtual characters for forming a certain adversarial lineup in a virtual scene in advance, and then, during a battle, the virtual characters in player's lineup battle with virtual characters in an enemy lineup to complete a game task, where different virtual characters may be configured with different equipment or props.

In order to upgrade the low-level props of the player to obtain high-level props, at present, a commonly used prop generation method in related technologies is that: the player needs to perform multiple tap operations on an adversarial interface of a game to complete a prop merging process, so that the generation operation is relatively cumbersome. More importantly, the cumbersome prop generation operation is irreversible, and once the player makes a mistake, the operation cannot be restored, resulting in a lower fault tolerance rate in prop generation.

For the foregoing problems, no effective solution has been provided at present.

SUMMARY

Provided is a prop generation method, including: displaying a prop list of a target account in a display interface displaying a virtual game scene, where the prop list includes prop icons of props obtained by the target account; displaying a preview prop icon of a merge prop matched with the first prop in a preview state in response to a drag operation performed on a prop icon of a first prop in the prop list, where the merge prop is a prop obtained by merging the first prop with a second prop in a candidate merging state; determining a target merge prop matched with an operation trajectory endpoint of the drag operation, and displaying generation progress information for merging the target merge prop; and canceling the generation of the target merge prop in response to a cancel operation triggered for the generation progress information and that the generation progress information indicates that the generation is not completed.

Provided is a prop generation apparatus, including: a first display unit, configured to display a prop list of a target account in a display interface displaying a virtual game scene, where the prop list includes prop icons of props obtained by the target account; a second display unit, configured to display a preview prop icon of a merge prop matched with the first prop in a preview state in response to a drag operation performed on a prop icon of a first prop in the prop list, where the merge prop is a prop obtained by merging the first prop with a second prop in a candidate merging state; a third display unit, configured to determine a target merge prop matched with an operation trajectory endpoint of the drag operation, and display generation progress information for merging the target merge prop; and a merging unit, configured to cancel the generation of the target merge prop in response to a cancel operation triggered for the generation progress information and that the generation progress information indicates that the generation is not completed.

Provided is a non-transitory computer-readable storage medium, and the computer-readable storage medium stores a computer-readable instruction, where the computer-readable instruction is configured to perform the foregoing prop generation method when running.

Provided is a computer program product or a computer program, where the computer program product or the computer program includes a computer-readable instruction, the computer-readable instruction is stored in a computer-readable storage medium, and a processor reads and executes the computer-readable instruction from the computer-readable storage medium to perform the foregoing prop generation method.

Provided is an electronic device, including a memory and a processor, where the memory stores a computer-readable instruction, and the processor is configured to perform the foregoing prop generation method through the foregoing computer-readable instruction.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from these accompanying drawings without creative efforts.

FIG. 2 is a schematic flowchart of an example prop generation method according to an embodiment of the present disclosure.

DESCRIPTION OF EMBODIMENTS

In order to make a person of ordinary skill in the art better understand the solutions of the present disclosure, the following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure without creative efforts fall within the protection scope of the present disclosure.

It is to be understood that in the specification, claims, and the foregoing accompanying drawings of the present disclosure, the terms "first", "second", and the like are used for distinguishing similar objects rather than describing a specific order or a precedence order. It is to be understood that such used data is interchangeable in appropriate circumstances so that the embodiments of the present disclosure described here may be implemented in an order other than those illustrated or described here. Moreover, the terms "include", "contain" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

It is to be understood that the embodiments of the present disclosure involve the following technical term:

Auto chess: it is a new type of multiplayer battle strategy game. Players may match and cultivate their own chess lineup to battle with their opponent lineup, hit points (HPs) of losers are deducted, and the ranking may be determined according to the elimination order.

Figure 1:
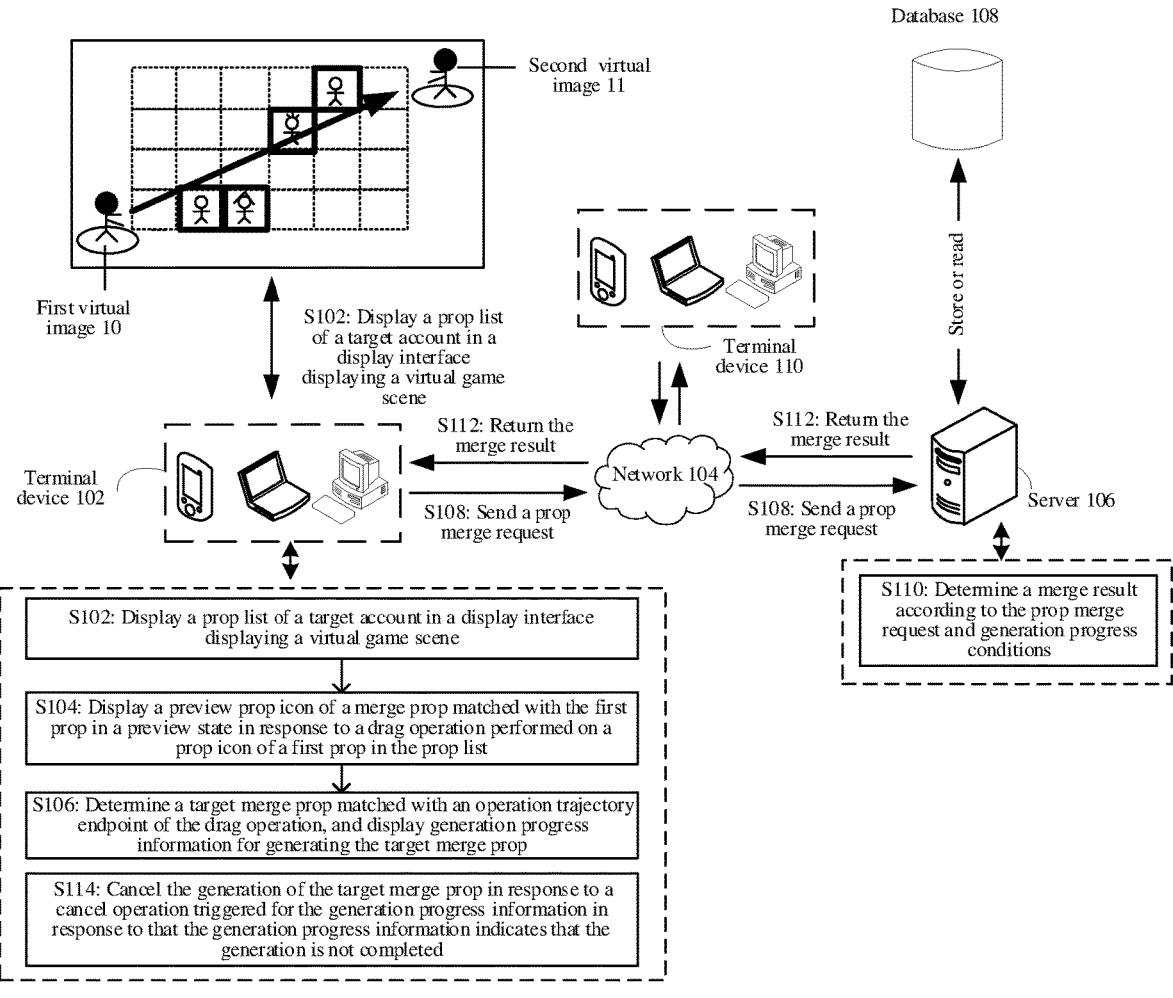
FIG. 1 is a schematic diagram of an application environment of an example prop generation method according to an embodiment of the present disclosure.

According to one aspect of an embodiment of the present disclosure, a prop generation method is provided. In one embodiment, the foregoing prop generation method may be applied to, but is not limited to, a prop generation system in a hardware environment shown in FIG. 1. The prop generation system may include, but is not limited to, a terminal device 102, a network 104, a server 106, a database 108, and a terminal device 110. Clients for battle game applications run in both the terminal device 102 and the terminal device 110. The foregoing terminal device 102 includes a human-computer interaction screen, a processor, and a memory. A virtual scene provided by a battle game task is displayed in the human-computer interaction screen. The virtual scene includes a first virtual image and a second virtual image participating in the battle game task and belonging to different camps. The first virtual image and the second virtual image here may directly battle in the virtual scene, and may also control own virtual characters to battle. The human-computer interaction screen is further configured to provide a human-computer interaction interface to receive a human-computer interaction operation for controlling the controlled virtual image in the virtual scene, and the virtual image will complete the battle game task set in the virtual scene. The processor is configured to generate an interactive instruction in response to the foregoing human-computer interaction operation, and send the interactive instruction to the server. The memory is configured to store relevant attribute data, such as picture data of a scene picture, attribute information of a virtual image controlled by a client (such as the level information of the virtual image, the HP of the virtual image, and the number or type of virtual characters owned by the virtual image), and virtual social resources held by the virtual image controlled by the client.

In addition, the server 106 includes a processing engine, and the processing engine is configured to perform a storage or read operation on the database 108. Specifically, the processing engine determines a finally generated prop object according to a generation operation instruction fed back by the terminal device 110. The processing engine then determines whether to cancel the current generation operation according to a subsequent control instruction, reads prop icons corresponding to different props from the database 108 in response to that the generation is determined, and displays corresponding prop icon objects in a game interface.

The specific process includes the following steps: Step S102: Display a prop list of a target account in a display interface displaying a virtual game scene in the terminal device 102. Step S104: Display a preview prop icon of a merge prop matched with the first prop in a preview state in response to a drag operation performed on a prop icon of a first prop in the prop list. Step S106: Determine a target merge prop matched with an operation trajectory endpoint of the drag operation, and display generation progress information for merging the target merge prop. Step S108: Send, by the terminal device 102, a merge request to the server 106 through the network 104.

Step S110: Determine, by the server 106, a merge result according to a prop merge request and generation progress conditions. Step S112: Return the merge result to the terminal device 102 through the network 104.

Step S114: Finally, cancel, by the terminal device 102, the generation of the target merge prop in response to a cancel operation triggered for the generation progress information and that the generation progress information indicates that the generation is not completed.

In another embodiment, when the terminal device 102 has a relatively strong computing ability, step S110 may also be completed by the terminal device 102. This is an example, and there are no limitations in this embodiment.

In this embodiment of the present disclosure, by the method including the steps of displaying a prop list of a target account in a display interface displaying a virtual game scene, where the prop list includes prop icons of props obtained by the target account; displaying a preview prop icon of a merge prop matched with the first prop in a preview state in response to a drag operation performed on a prop icon of a first prop in the prop list, where the merge prop is a prop obtained by merging the first prop with a second prop in a candidate merging state; determining a target merge prop matched with an operation trajectory endpoint of the drag operation, and displaying generation progress information for merging the target merge prop; and canceling the generation of the target merge prop in response to a cancel operation triggered for the generation progress information and that the generation progress information indicates that the generation is not completed, a merge prop may be displayed in a preview mode, and a control method for canceling generation is provided to avoid the situation that a user cannot cancel the generation due to incorrect operations resulting in incorrect generation, thereby solving the technical problem of low fault tolerance rate in existing prop generation methods.

In one embodiment, as shown in FIG. 2, the foregoing prop generation method includes:

S202: Display a prop list of a target account in a display interface displaying a virtual game scene, where the prop list includes prop icons of props obtained by the target account.

S204: Display a preview prop icon of a merge prop matched with the first prop in a preview state in response to a drag operation performed on a prop icon of a first prop in the prop list, where the merge prop is a prop obtained by merging the first prop with a second prop in a candidate merging state.

S206: Determine a target merge prop matched with an operation trajectory endpoint of the drag operation, and display generation progress information for merging the target merge prop.

S208: Cancel the generation of the target merge prop in response to a cancel operation triggered for the generation progress information and that the generation progress information indicates that the generation is not completed.

It is to be understood that the foregoing virtual game may be a chess game, a shooting game, or any type of game including equipment props. When a player starts a game and enters a game interface, identifiers of the obtained virtual props may be displayed in a prop list in the game interface. An identifier of a virtual prop in this embodiment may be an icon of the virtual prop, a name of the virtual prop, or the like.

Figure 3:
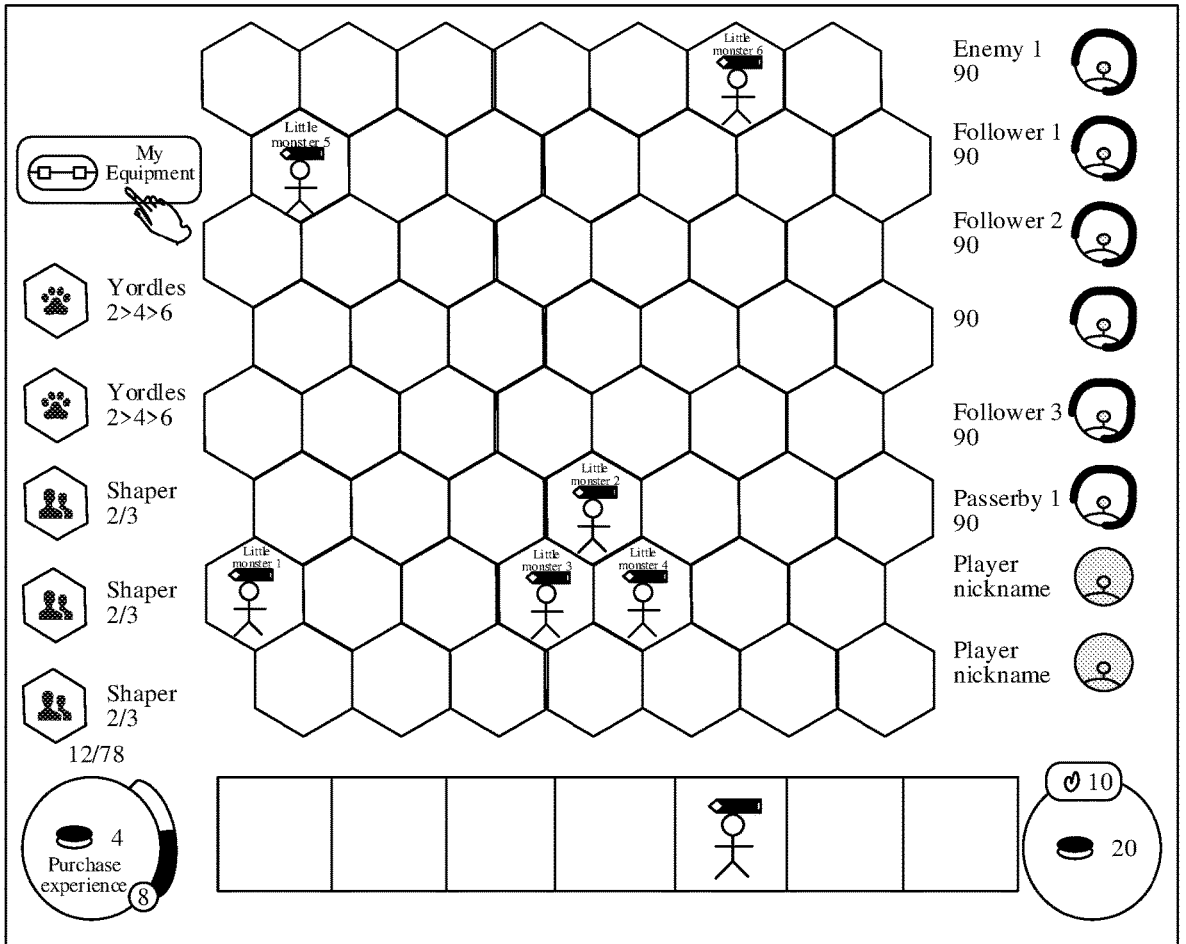
FIG. 3 is a schematic diagram of an example prop generation method according to an embodiment of the present disclosure.

The game interface shown in FIG. 3 is a schematic diagram of an example battle game interface. As shown in the figure, one party controls virtual characters "little monster 1", "little monster 2", "little monster 3" and "little monster 4" to battle with virtual characters "little monster 5" and "little monster 6" controlled by an enemy. It can be understood that in this embodiment, one party may obtain virtual resources through battles to exchange virtual props and assemble the virtual props on different virtual characters to enhance the battle capability of the virtual characters. As shown in FIG. 3, in response to that a touch operation performed on a "My Equipment" control displayed at the upper left corner of the interface is detected, all virtual props owned by one party may be displayed.

Figure 4:
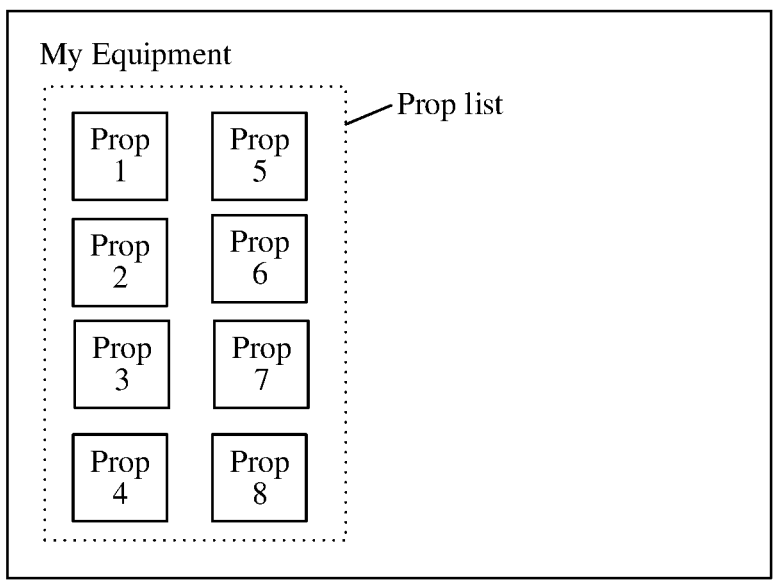
FIG. 4 is a schematic diagram of another example prop generation method according to an embodiment of the present disclosure.

In response to that the touch operation on the "My Equipment" control shown in FIG. 3 is detected, a "My Equipment" interface shown in FIG. 4 is displayed, a prop list of a target account is displayed in the interface, and the list includes prop icons obtained by the target account. FIG. 4 shows the "prop 1", "prop 2", "prop 3", "prop 4", "prop 5", "prop 6", "prop 7" and "prop 8" obtained by the target account. It is to be understood that the identifiers shown in the figure are only used for indicating that the equipment displayed in the figure is different, an equipment bar may specifically display the icon or name of the virtual equipment, and the specifically displayed content may be determined according to actual situations and is not limited here.

It can be understood that in response to that a trigger operation performed on the "My Equipment" control in FIG. 3 is detected, the foregoing "My Equipment" interface, that is, the interface shown in FIG. 4, may be displayed in a half-screen suspending mode in the game interface shown in FIG. 3, or displayed in a full-screen mode in a new interface. The display mode of the foregoing "My Equipment" interface is not limited here.

Figure 5:
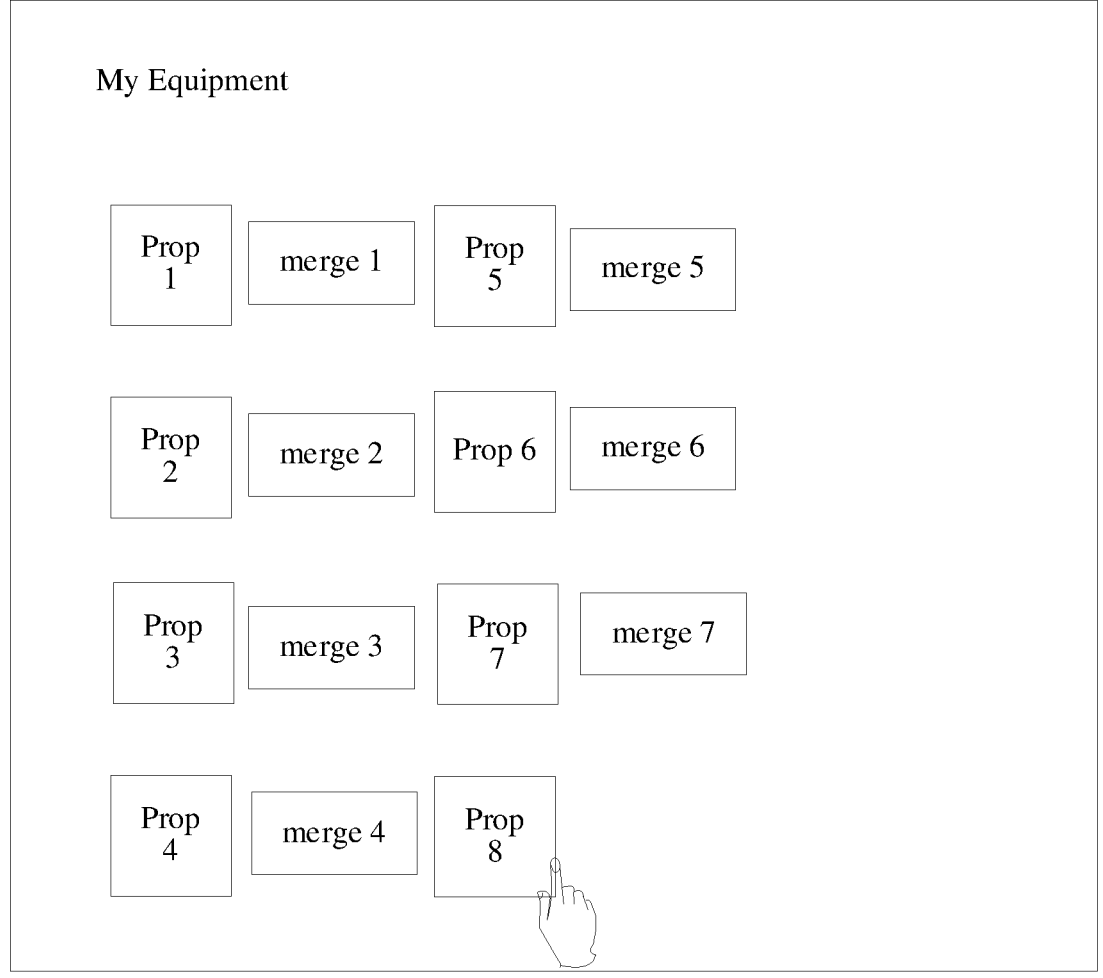
FIG. 5 is a schematic diagram of another example prop generation method according to an embodiment of the present disclosure.

As shown in FIG. 5, as a specific implementation, it is assumed that a first virtual prop is the prop 8, and all other props (props 1 to 7) in a prop bar, except for the prop 8, may be merged with the prop 8. As shown in FIG. 5, a player may drag the prop 8 to implement a first touch operation, and preview prop icons that may be merged by the prop 8 and other props are displayed in the game interface. The identifier "generation 1" displayed in the target game interface shown in FIG. 5 indicates that the prop 8 and the prop 1 may be merged into a virtual merge prop "generation 1". In this embodiment, the identifiers of virtual merge props that may be merged in the game interface are displayed to play a prompt role to prompt the player to select the merge prop to be merged from multiple target virtual props that may be merged.

In one embodiment, assuming that the player selects the "prop 8" and the "prop 7" for merging in the game interface shown in FIG. 5, the player may drag the "prop 8" to the position of the "prop 7"; in response to that the "prop 8" overlaps with the "prop 7", the "prop 8" is merged with the "prop 7" to obtain a first merge prop "generation 7"; and the "generation 7" may be displayed as a new virtual prop obtained by the player in the prop bar. In this embodiment, the target virtual character is a game object controlled by the player in a game. The player may control the target virtual character by touching operation keys in a target game. For example, the player may control the target virtual character to use the newly merged first merge prop "generation 7" to perform attack operations on enemies. In this embodiment, the player may implement the generation of a prop by performing a drag operation, so that the operation is simple and efficient, and the game operation experience of the player may be enhanced.

Figure 8:
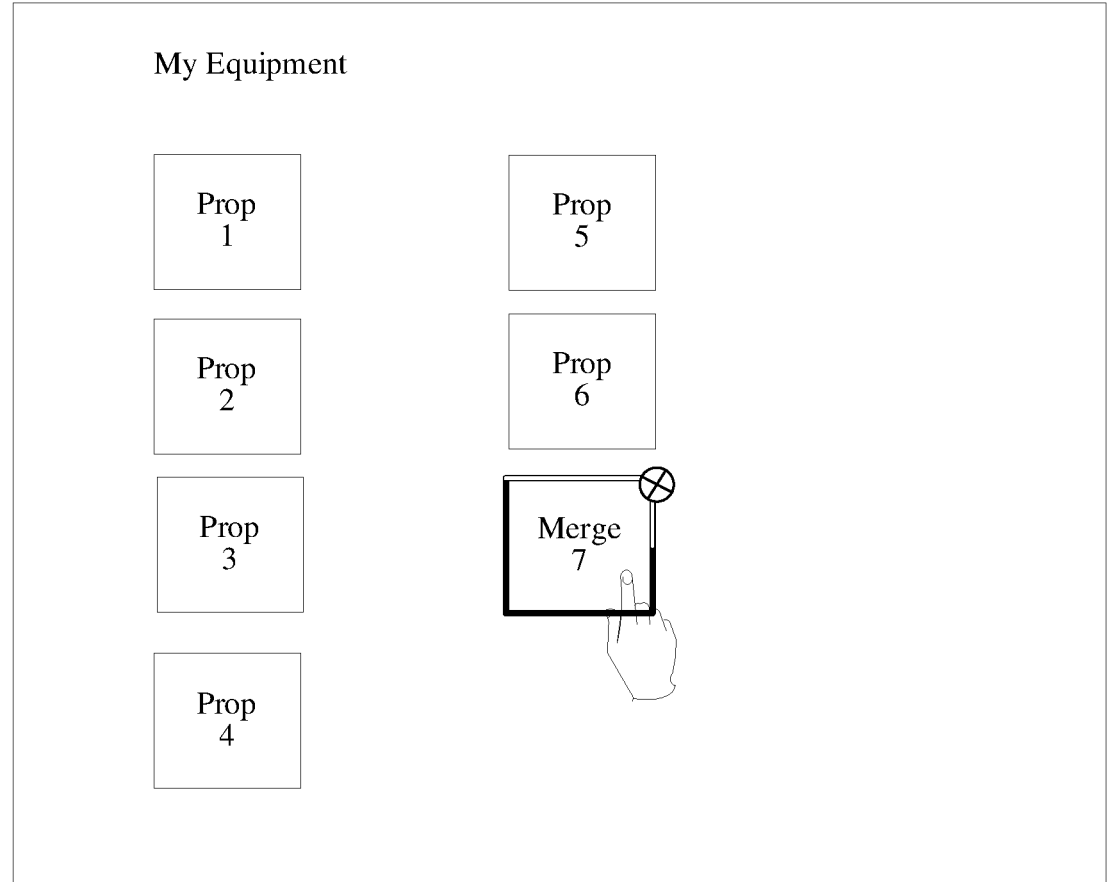
FIG. 8 is a schematic diagram of another example prop generation method according to an embodiment of the present disclosure.

Further, as shown in FIG. 8, the target merge prop "generation 7" matched with the operation trajectory endpoint of the drag operation is displayed, and at the same time, generation progress information for merging the prop is displayed. In FIG. 8, the generation progress information is displayed through a highlighted part of an outer border of the icon of the "generation 7". The display mode of the outer border of the "generation 7" in FIG. 8 indicates that the generation progress of the "generation 7" has passed ⅜. Moreover, an "x" button is displayed on the outer border of the icon of the "generation 7" to indicate that the player may cancel the generation operation by touching this button. Assuming that the player performs a touch operation on the "x" button on the outer border of the "generation 7" in FIG. 8, the generation operation of the "generation 7" is canceled, and the prop list is restored to the display interface shown in FIG. 4.

In this embodiment of the present disclosure, by the method including the steps of displaying a prop list of a target account in a display interface displaying a virtual game scene, where the prop list includes prop icons of props obtained by the target account; displaying a preview prop icon of a merge prop matched with the first prop in a preview state in response to a drag operation performed on a prop icon of a first prop in the prop list, where the merge prop is a prop obtained by merging the first prop with a second prop in a candidate merging state; determining a target merge prop matched with an operation trajectory endpoint of the drag operation, and displaying generation progress information for merging the target merge prop; and canceling the generation of the target merge prop in response to a cancel operation triggered for the generation progress information and that the generation progress information indicates that the generation is not completed, a merge prop may be displayed in a preview mode, and a control method for canceling generation is provided to avoid the situation that a user cannot cancel the generation due to incorrect operations resulting in incorrect generation, thereby solving the technical problem of low fault tolerance rate in existing prop generation methods.

In one embodiment, the operation of determining a target merge prop matched with an operation trajectory endpoint of the drag operation, and displaying generation progress information for merging the target merge prop includes:

S1: Determine that the focus position of the touch focus is located on an operation trajectory of the drag operation in response to that a touch focus of the drag operation is detected.

S2: Determine that the disappearance position of the touch focus is the operation trajectory endpoint of the drag operation in response to detecting that the touch focus on the operation trajectory disappears, and determine a merge prop corresponding to the second prop that overlaps with the operation trajectory endpoint as the target merge prop.

S3: Display a prop icon of the target merge prop, and display the generation progress information on the prop icon of the target merge prop.

It can be understood that in this embodiment, the endpoint of the drag operation is determined by detecting the touch focus to determine a prop object participating in prop generation. Further, in response to that the operation trajectory endpoint of the drag operation is determined and the merge prop corresponding to the second prop that overlaps with the operation trajectory endpoint is determined as the target merge prop, the prop icon of the target merge prop is highlighted. Example display modes are as follows: the whole of the prop icon of the target merge prop is displayed in a highlighted mode; the border of the prop icon of the target merge prop is displayed in a highlighted mode; the prop icon of the target merge prop is displayed in a bold mode; and the prop icon of the target merge prop is displayed in a grayscale mode. The foregoing display modes are only illustrative, and actual display modes are not limited.

Further, the prop icon of the target merge prop is highlighted, and at the same time, the generation progress information is displayed on the prop icon of the target merge prop. Example modes are as follows: the generation progress information is displayed by a circular progress bar on the border of the prop icon of the target merge prop; the generation progress information is displayed by a linear progress bar below the prop icon of the target merge prop; the generation progress information is displayed by a sector-shaped progress bar on the left/right side of the prop icon of the target merge prop; and the generation progress information is displayed by a percentage number on the left/right side of the border of the prop icon of the target merge prop. The foregoing generation progress display modes are only illustrative, and actual display modes are not limited.

Specifically, as shown in FIG. 8, the target merge prop "generation 7" matched with the operation trajectory endpoint of the drag operation is displayed, and at the same time, generation progress information for merging the prop is displayed. In FIG. 8, the generation progress information is displayed through a highlighted part of an outer border of the icon of the "generation 7". The display mode of the outer border of the "generation 7" in FIG. 8 indicates that the generation progress of the "generation 7" has passed ⅜. Moreover, an "x" button is displayed on the outer border of the icon of the "generation 7" to indicate that the player may cancel the generation operation by touching this button. Assuming that the player performs a touch operation on the "x" button on the outer border of the "generation 7" in FIG. 8, the generation operation of the "generation 7" is canceled, and the prop list is restored to the display interface shown in FIG. 4.

In the foregoing embodiment of the present disclosure, by the display mode including the steps of determining that the focus position of the touch focus is located on an operation trajectory of the drag operation in response to that a touch focus of the drag operation is detected; determining that the disappearance position of the touch focus is the operation trajectory endpoint of the drag operation in response to detecting that the touch focus on the operation trajectory disappears, and determining a merge prop corresponding to the second prop that overlaps with the operation trajectory endpoint as the target merge prop; and displaying a prop icon of the target merge prop, and displaying the generation progress information on the prop icon of the target merge prop, the icon of the merge prop is displayed, and at the same time, the generation progress of the merge prop is displayed in a dynamic display mode, so that the process of merging a prop is more visualized. Moreover, a buffer time for prop generation is provided, so that the user may cancel the generation operation when the generation progress is not completed to solve the technical problem of low fault tolerance rate in existing prop generation operation methods.

In one embodiment, the operation of canceling the generation of the target merge prop in response to a cancel operation triggered for the generation progress information and that the generation progress information indicates that the generation is not completed includes:

S1: Determine to trigger the cancel operation in response to a tap operation performed on the prop icon of the target merge prop and that the generation progress information indicates that the generation is not completed.

S2: Cancel the generation of the target merge prop, and restore and store the first prop and the second prop for merging the target merge prop to original positions.

It can be understood that in response to that the generation progress information indicates that the generation operation is not completed, after it is detected that the tap operation is performed on the prop icon of the merge prop, the generation operation may be canceled, thereby providing a control method for canceling the generation operation, and providing a control method for correcting incorrect operations when incorrect generation is caused by incorrect operations of the user.

In some embodiments, the foregoing tap operation on the merge prop may be a tap operation directly performed on the prop icon of the merge prop, or a tap operation performed on an operation control displayed on the merge prop. The specific operation mode of the cancel operation is not limited here.

As an example display mode, the foregoing display mode of restoring and storing the first prop and the second prop for merging the target merge prop to original positions may be a display mode relative to an inverse process of the merge display manner of the first prop and the second prop. For example, in the process of merging the first prop and the second prop, the icons of the first prop and the second prop are controlled to be displayed in a fused mode, and the prop icon of the merge prop is gradually displayed. Compared with the merge display manner, the display mode of restoring and storing the first prop and the second prop for merging the target merge prop to original positions may be as follows: the prop icon of the merge prop is first displayed in a fade-out mode and then split into two icons, namely a first prop icon and a second prop icon, and then, the first prop icon and the second prop icon are restored to original positions in a sliding display mode.

As another example display mode, in response to that it is determined to cancel the generation, the prop icon of the merge prop is first controlled to be displayed in a plurality of broken dots, and the plurality of dots are divided into two sets of dots to be respectively moved to the original positions of the first prop icon and the second prop icon to display aggregation of the dots, thereby restoring the display of the first prop icon and the second prop icon in the original positions.

The foregoing display mode is only illustrative, and the specific display restoring mode is not limited here.

In a specific implementation, as shown in FIG. 8 and FIG. 4, in response to detecting that a touch operation is performed on an "x" control at the upper right of the icon of the "generation 7" displayed in FIG. 8, it is determined to cancel the generation operation, and then, the first prop and the second prop for merging the target merge prop are restored and stored to original positions, that is, a prop list interface shown in FIG. 4 is displayed.

In this embodiment, by the method including the steps of determining to trigger the cancel operation in response to a tap operation performed on the prop icon of the target merge prop and that the generation progress information indicates that the generation is not completed; and canceling the generation of the target merge prop, and restoring and storing the first prop and the second prop for merging the target merge prop to original positions, an operation mode for canceling generation in the process of merging a prop is provided, and then, a correction method for operations of incorrect generation is provided, thereby avoiding the incorrect generation caused by incorrect operations of the player, and solving the technical problem of low fault tolerance rate in existing generation operations.

In one embodiment, the operation of restoring and storing the first prop and the second prop for merging the target merge prop to original positions includes:

S1: Redisplay the prop icon of the second prop for merging the target merge prop in the prop list in response to that the second prop for merging the target merge prop is a prop in the prop list of the target account.

S2: Reequip the second prop for merging the target merge prop on the target virtual character in response to that the second prop for merging the target merge prop is a prop equipped by a target virtual character in the virtual game scene.

It can be understood that in this embodiment, a virtual prop may exert prop effects when equipped on a virtual character. Based on this, the generation of the virtual prop may be implemented in two modes. Corresponding to different generation methods, there are also multiple methods for restoring and storing the first prop and the second prop for merging the target merge prop to original positions.

As an example generation method, generation is directly performed in the prop list corresponding to the target account. In this generation method, the operation of restoring and storing the first prop and the second prop for merging the target merge prop to original positions may be as follows: the prop icons of the first prop and the second prop for merging are restored and displayed directly in the prop list.

As another generation method, when a virtual character for equipping virtual props is determined, in response to that the virtual character is equipped with a first virtual prop and a second virtual prop is dragged to be merged with the first virtual prop equipped by the virtual character, the generation operation may be canceled, the first virtual prop is reequipped on the virtual character, and the second virtual prop is restored and displayed in the prop list.

It can be understood that the foregoing mode of restoring the display at original positions is only illustrative, and the specific display restoring mode is not limited.

According to the foregoing embodiment of the present disclosure, by two different restoring and storing modes of redisplaying the prop icon of the second prop for merging the target merge prop in the prop list in response to that the second prop for merging the target merge prop is a prop in the prop list of the target account; and reequipping the second prop for merging the target merge prop on the target virtual character in response to that the second prop for merging the target merge prop is a prop equipped by a target virtual character in the virtual game scene, the restoring and storing display effects are enriched, and the technical problem of low fault tolerance rate in existing equipment generation methods is solved.

In one embodiment, the foregoing method further includes:

S1: When it is determined that the focus position of the touch focus is located on the operation trajectory of the drag operation, in response to that the dwell duration of the touch focus at the focus position is greater than the target duration, display prop description information corresponding to the target merge prop.

S2: When it is determined that the disappearance position of the touch focus is the operation trajectory endpoint of the drag operation, hide the prop description information corresponding to the displayed target merge prop.

It can be understood that in the process of the prop generation operation, in response to that the dwell duration of the touch focus at the focus position is greater than the target duration, the prop description information corresponding to the target merge prop is displayed, thereby displaying the description information of the merge prop in detail; and when it is determined that the disappearance position of the touch focus is the operation trajectory endpoint of the drag operation, the prop description information corresponding to the displayed target merge prop is hidden, so that in response to that the user cancels the dwell operation, the display of the detailed description information of the merge prop is canceled. As a result, in the process of prop generation, the detailed description information of a pre-merge prop is provided, and in response to that the touch focus of the user is dwelled on the prop, the detailed description information is displayed, so that the user may further determine whether the pre-merge prop is a desired merge prop object.

Figure 7:
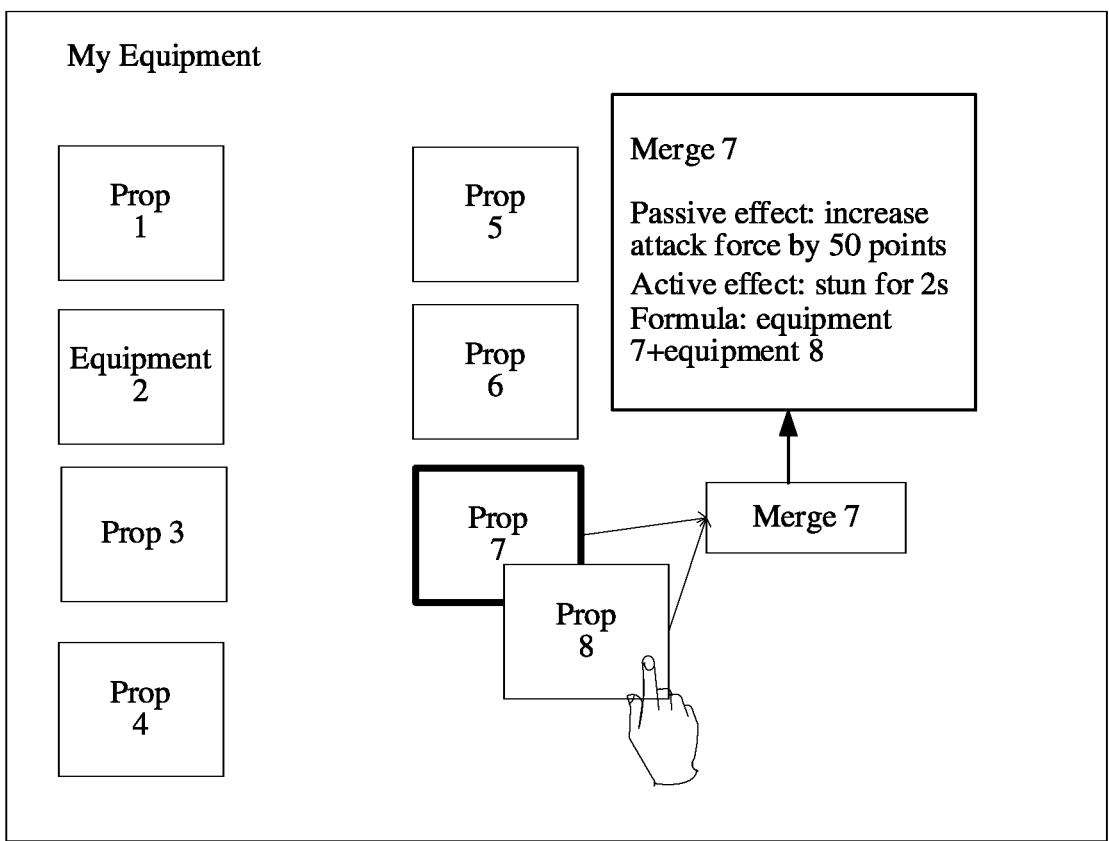
FIG. 7 is a schematic diagram of another example prop generation method according to an embodiment of the present disclosure.

The foregoing method is described with reference to FIG. 7. As shown in FIG. 7, in response to that the icon of the "prop 8" is dragged on the icon of the "prop 7" for a dwell operation (that is, a long press state is kept after the drag operation), the icon of the merge prop "generation 7" is displayed in a sliding mode on the right side of the icon of the "prop 7", and the prop description information of the "generation 7" is displayed as follows:

"Generation 7 passive effect: increase attack force by 50 points active effect: stun for 2 s formula: equipment 7+equipment 8".

According to the foregoing embodiment of the present disclosure, by the operation method including the steps: when it is determined that the focus position of the touch focus is located on the operation trajectory of the drag operation, in response to that the dwell duration of the touch focus at the focus position is greater than the target duration, displaying prop description information corresponding to the target merge prop; and when it is determined that the disappearance position of the touch focus is the operation trajectory endpoint of the drag operation, hiding the prop description information corresponding to the displayed target merge prop, in the process of performing the drag operation by the user, a pre-merge prop may be quickly previewed, and the description information of the pre-merge prop may be displayed through the dwell operation, thereby avoiding the user from performing incorrect generation operations, and solving the technical problem of low fault tolerance rate in existing prop generation operations.

In one embodiment, after the foregoing operation of displaying the generation progress information for merging the target merge prop, in response to that the generation progress information indicates that the generation is completed, the animation prompt information of the target merge prop obtained by merging is displayed.

In the interface shown in FIG. 8, assuming that the border progress bar information of the "generation 7" indicates that the generation is completed, the animation prompt information of the target merge prop obtained by merging is displayed. In some embodiments, the foregoing animation prompt information may be displayed in the following display modes: the icon of the merge prop is displayed in a jump mode; the icon of the merge prop is transitorily displayed in a highlighted mode; the icon of the merge prop is transitorily displayed in a grayscale mode; and the generation prompt information "successful generation!" is displayed. The foregoing display modes of the animation prompt information are only illustrative, and the specific prompt mode is not limited.

According to the foregoing embodiment of the present disclosure, in response to that the generation progress information indicates that the generation is completed, the animation prompt information of the target merge prop obtained by merging is displayed, so that in response to that the generation is completed, the merge result is prompted in an animation mode to improve the prompt effect of the merge result.

In one embodiment, the foregoing operation of displaying a preview prop icon of a merge prop matched with the first prop in a preview state in response to a drag operation performed on a prop icon of a first prop in the prop list includes:

S1: Display the preview prop icon of the merge prop matched with the second prop in the prop list in response to the drag operation performed on the prop icon of the first prop, where the prop allowed to be merged with the first prop in the prop list is determined as the second prop in the candidate merging state, the prop icon of the first prop and the prop icon of the second prop have a same display style, and the preview prop icon of the merge prop and the prop icon of the first prop have different display styles.

S2: Determine the merge prop matched with the first target prop as the target merge prop in response to that the operation trajectory endpoint of the drag operation overlaps with a first target prop in the second props in the candidate merging state.

The foregoing implementation is described below with reference to FIG. 5 and FIG. 6. As shown in FIG. 5, assuming that the "prop 8" is the first prop, corresponding to the drag operation on the first prop, corresponding merge props "generation 1", "generation 2", "generation 3", "generation 4", "generation 5", "generation 6" and "generation 7" are displayed on the right sides of the icons of the "prop 1", the "prop 2", the "prop 3", the "prop 4", the "prop 5", the "prop 6" and the "prop 7" in a sliding mode. As shown in FIG. 5, the icons of the "generation 1", the "generation 2", the "generation 3", the "generation 4", the "generation 5", the "generation 6" and the "generation 7" are all displayed as rectangular icons, and the icons of the "prop 1", the "prop 2", the "prop 3", the "prop 4", the "prop 5", the "prop 6", the "prop 7" and the "prop 8" are all displayed as square icons. It can be understood that the "generation 1", the "generation 2", the "generation 3", the "generation 4", the "generation 5", the "generation 6" and the "generation 7" are second props in the candidate merging state.

Figure 6:
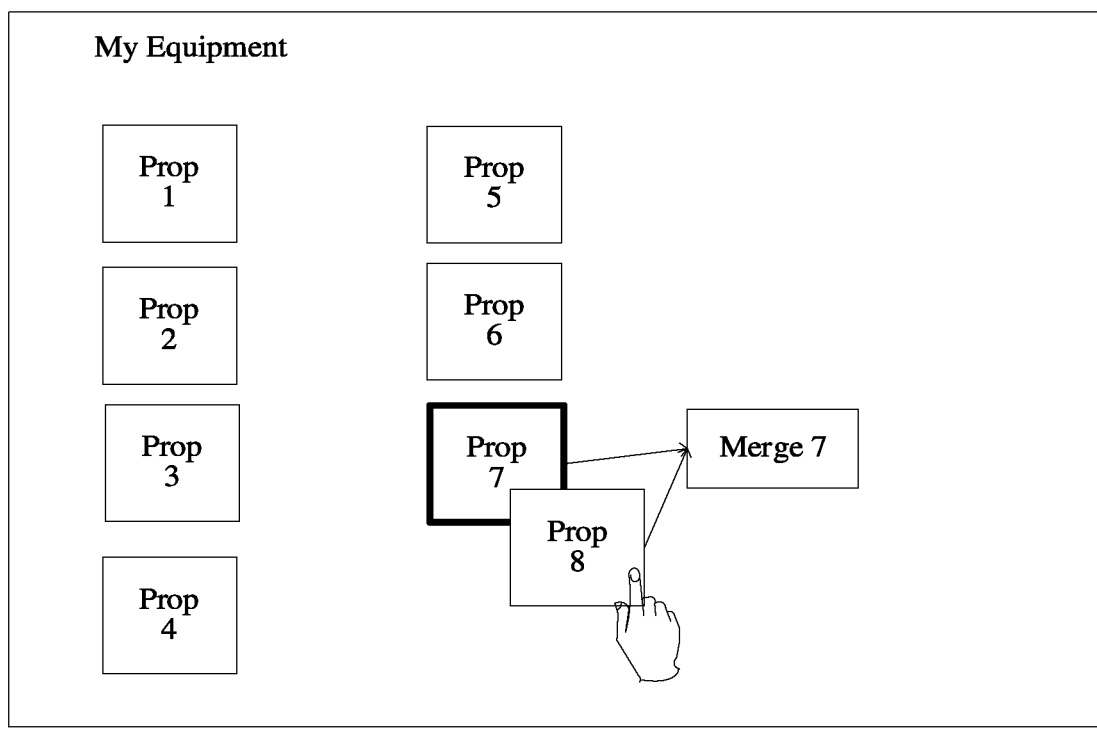
FIG. 6 is a schematic diagram of another example prop generation method according to an embodiment of the present disclosure.

As shown in FIG. 6, in response to that the icon of the "prop 8" is dragged and overlaps with the icon of the "prop 7", it is determined that the "generation 7" is the target merge prop, and then, the subsequent generation operation is performed.

According to the foregoing implementation, by the method including the steps of displaying the preview prop icon of the merge prop matched with the second prop in the prop list in response to the drag operation performed on the prop icon of the first prop, where the prop allowed to be merged with the first prop in the prop list is determined as the second prop in the candidate merging state, the prop icon of the first prop and the prop icon of the second prop have a same display style, and the preview prop icon of the merge prop and the prop icon of the first prop have different display styles; and determining the merge prop matched with the first target prop as the target merge prop in response to that the first target prop as the target merge prop in response to that the operation trajectory endpoint of the drag operation overlaps with a first target prop in the second props in the candidate merging state, the target merge prop may be determined in a plurality of candidate merge props through the drag operation, thereby improving the operation efficiency of the merge prop.

In one embodiment, the foregoing operation of displaying a preview prop icon of a merge prop matched with the first prop in a preview state in response to a drag operation performed on a prop icon of a first prop in the prop list includes:

S1: Display the preview prop icon of the merge prop matched with the second prop equipped by the virtual character in a prompt region corresponding to each virtual character in the virtual game scene in response to the drag operation performed on the prop icon of the first prop, where the prop equipped by the virtual character, allowed to be merged with the first prop, is determined as the second prop in the candidate merging state.

S2: Determine the second prop equipped by the reference virtual character as a second target prop in response to that the operation trajectory endpoint of the drag operation overlaps with a reference virtual character, and determine the merge prop matched with the second target prop as the target merge prop.

Figure 9:
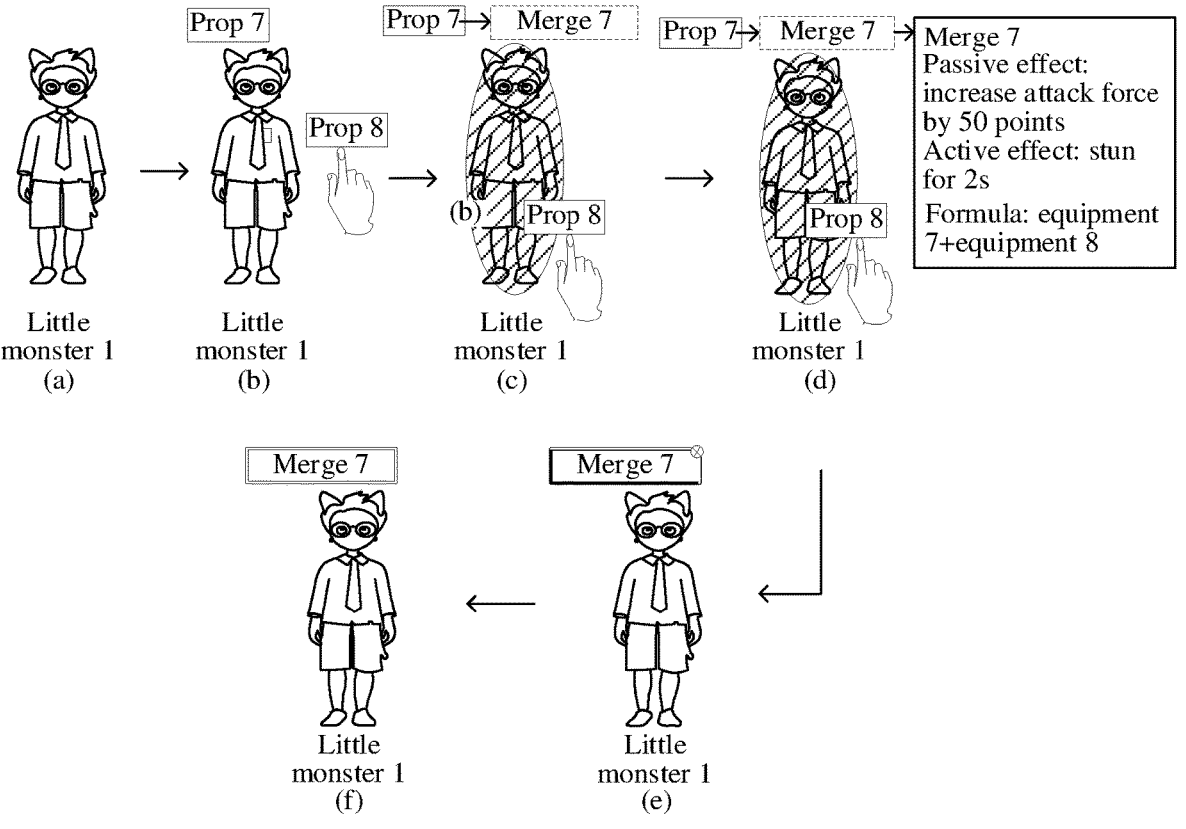
FIG. 9 is a schematic diagram of another example prop generation method according to an embodiment of the present disclosure.

The foregoing implementation method is described below with reference to FIG. 9. FIG. 9 shows a method of determining virtual characters for prop generation and then performing prop generation. As shown in FIG. 9(a), a virtual character "little monster 1" for prop generation is determined. As shown in FIG. 9(b), in response to that the "prop 8" is selected as the first prop, the equipped virtual prop "prop 7" is displayed at the top of the head of the virtual character "little monster 1". Then, as shown in FIG. 9(c), in response to that the "prop 8" is dragged onto the icon of the "little monster 1" and overlaps with the icon of the "little monster 1", generation preview prompt information "prop 7→generation 7" is displayed at the top of the head of the "little monster 1" to indicate that the "prop 8" may be merged with the "prop 7", and "generation 7" may be obtained. Moreover, the icon of the selected "little monster 1" is displayed in a shadow mode to indicate that the foregoing virtual prop "generation 7" will be equipped on the "little monster 1". Further, as shown in FIG. 9(d), in response to that the "prop 8" is dragged and dwelled on the icon of the "little monster 1", the generation detailed information of the "generation 7" is displayed. As shown in FIG. 9(e), in response to that the generation is determined, the generation progress of the "generation 7" is displayed at the top of the head of the "little monster 1". It can be understood that in response to that a touch operation on "x" at the upper right corner of the icon of the "generation 7" is detected, this generation operation is canceled; and in response to that the cancel operation is not detected, as shown in FIG. 9(f), it shows that the virtual character "little monster 1" is equipped with the "generation 7".

According to the foregoing embodiment of the present disclosure, by the method including the steps of displaying the preview prop icon of the merge prop matched with the second prop equipped by the virtual character in a prompt region corresponding to each virtual character in the virtual game scene in response to the drag operation performed on the prop icon of the first prop, where the prop equipped by the virtual character, allowed to be merged with the first prop, is determined as the second prop in the candidate merging state; and determining the second prop equipped by the reference virtual character as a second target prop in response to that the operation trajectory endpoint of the drag operation overlaps with a reference virtual character, and determining the merge prop matched with the second target prop as the target merge prop, a method for prop generation and generation cancellation of virtual characters is provided, so that in response to that a user performs prop generation operations for specific virtual characters, the generation progress may be accurately controlled to avoid the occurrence of incorrect generation operations, so as to solve the technical problem of low fault tolerance rate in existing generation methods.

Figure 10:
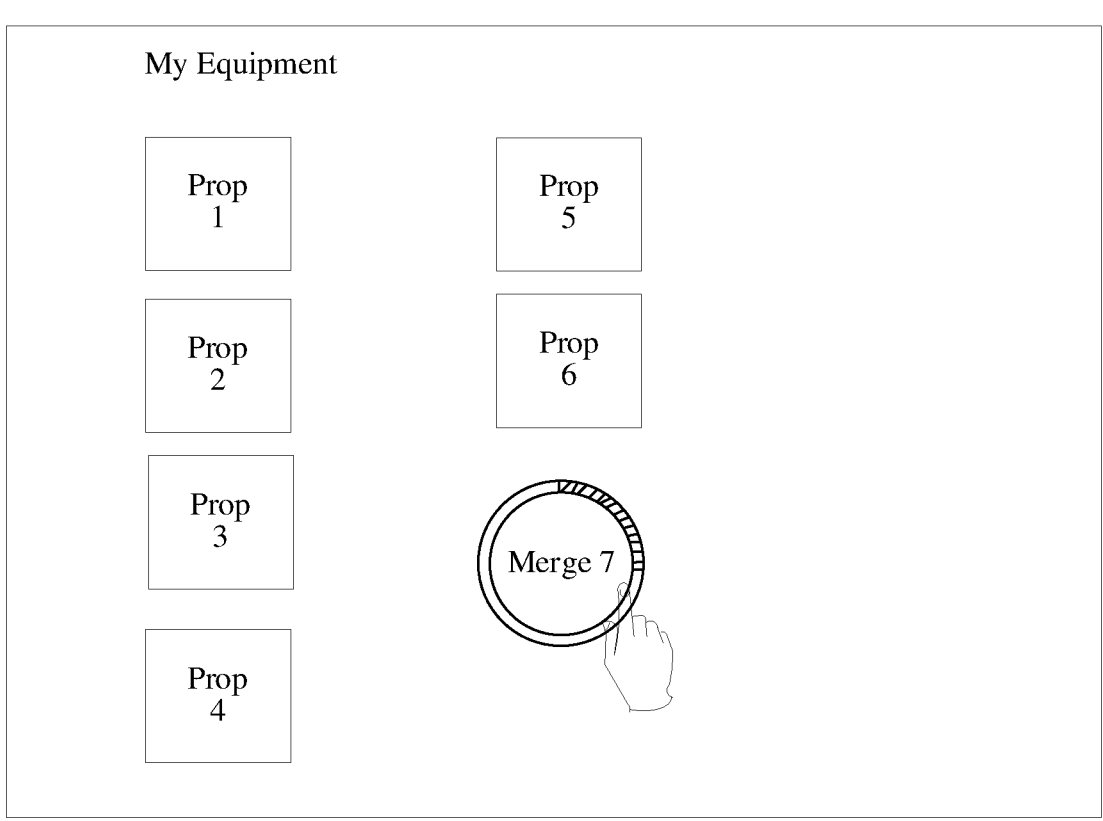
FIG. 10 is a schematic diagram of another example prop generation method according to an embodiment of the present disclosure.

In one embodiment, the foregoing operation of displaying the generation progress information on the prop icon of the target merge prop includes one of the following:

a circular progress bar matched with the generation progress information is displayed on the prop icon of the target merge prop; and the specific display mode may be shown in FIG. 10.

Figure 11:
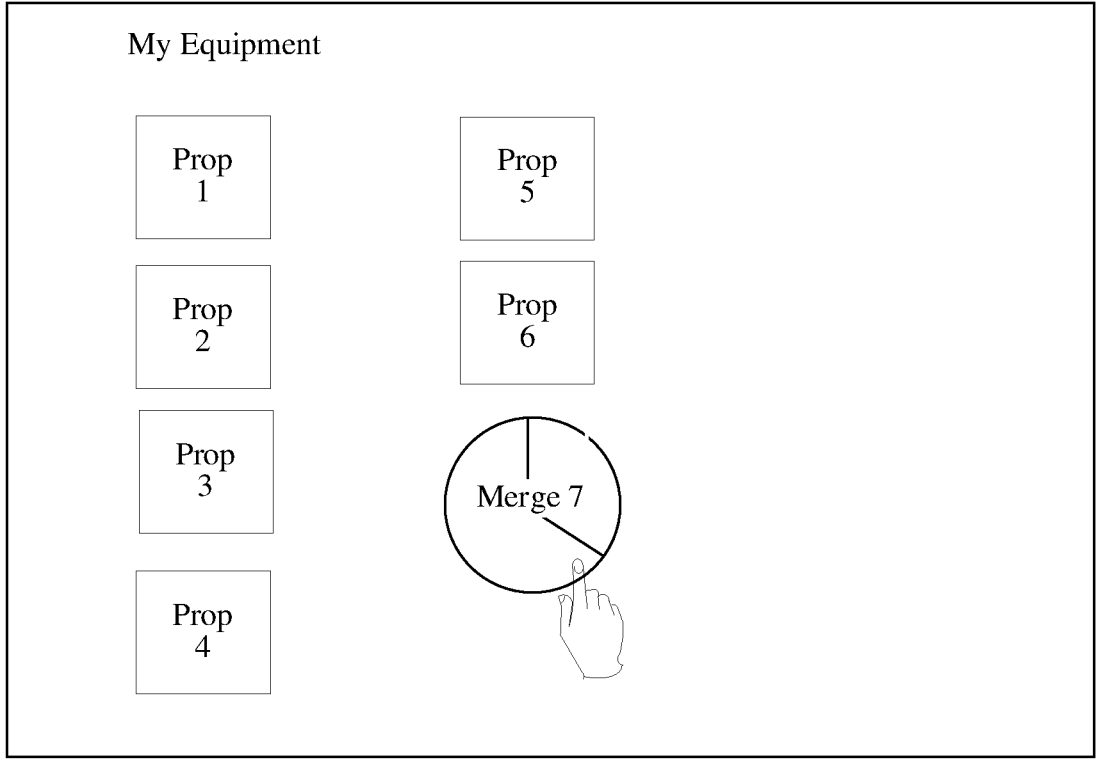
FIG. 11 is a schematic diagram of another example prop generation method according to an embodiment of the present disclosure.

A sector-shaped highlighted region matched with the generation progress information is displayed on the prop icon of the target merge prop; and the specific display mode may be shown in FIG. 11.

Figure 12:
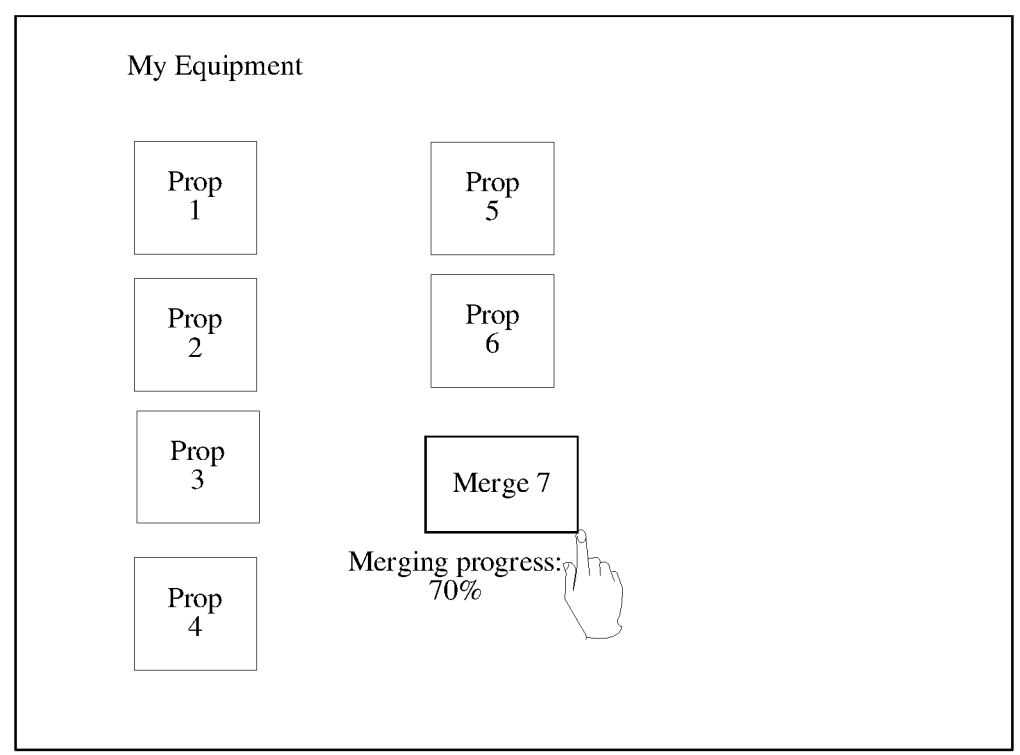
FIG. 12 is a schematic diagram of another example prop generation method according to an embodiment of the present disclosure.

A generation progress percentage matched with the generation progress information is displayed on the prop icon of the target merge prop; and the specific display mode may be shown in FIG. 12.

Figure 13:
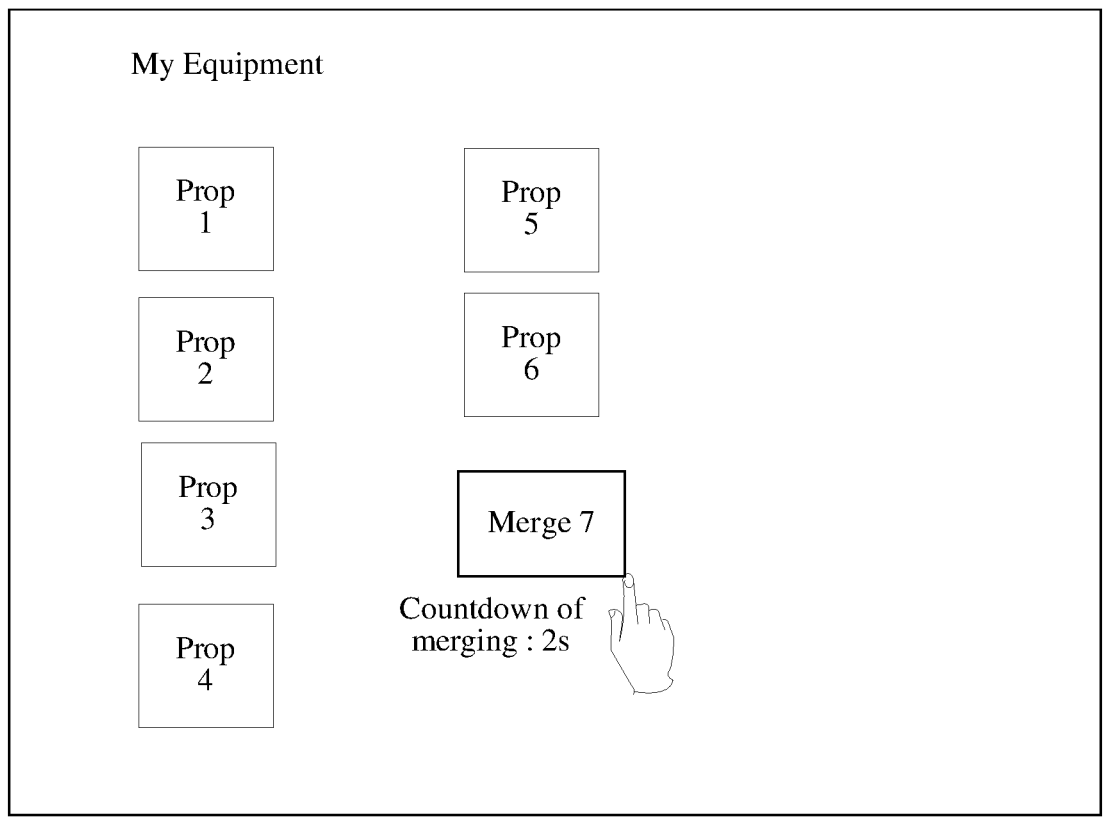
FIG. 13 is a schematic diagram of another example prop generation method according to an embodiment of the present disclosure.

A countdown of the completion of generation of the target merge prop, matched with the generation progress information, is displayed on the prop icon of the target merge prop; and the specific display mode may be shown in FIG. 13.

It can be understood that the foregoing four modes of displaying the generation progress information are only illustrative, and the specific display mode is not limited.

Through the foregoing implementations of the present disclosure, the display process of the generation progress information is more visualized, and the efficiency of prop generation display is improved.

An example embodiment of the present disclosure is described below with reference to FIG. 14 and FIG. 15.

Figure 14:
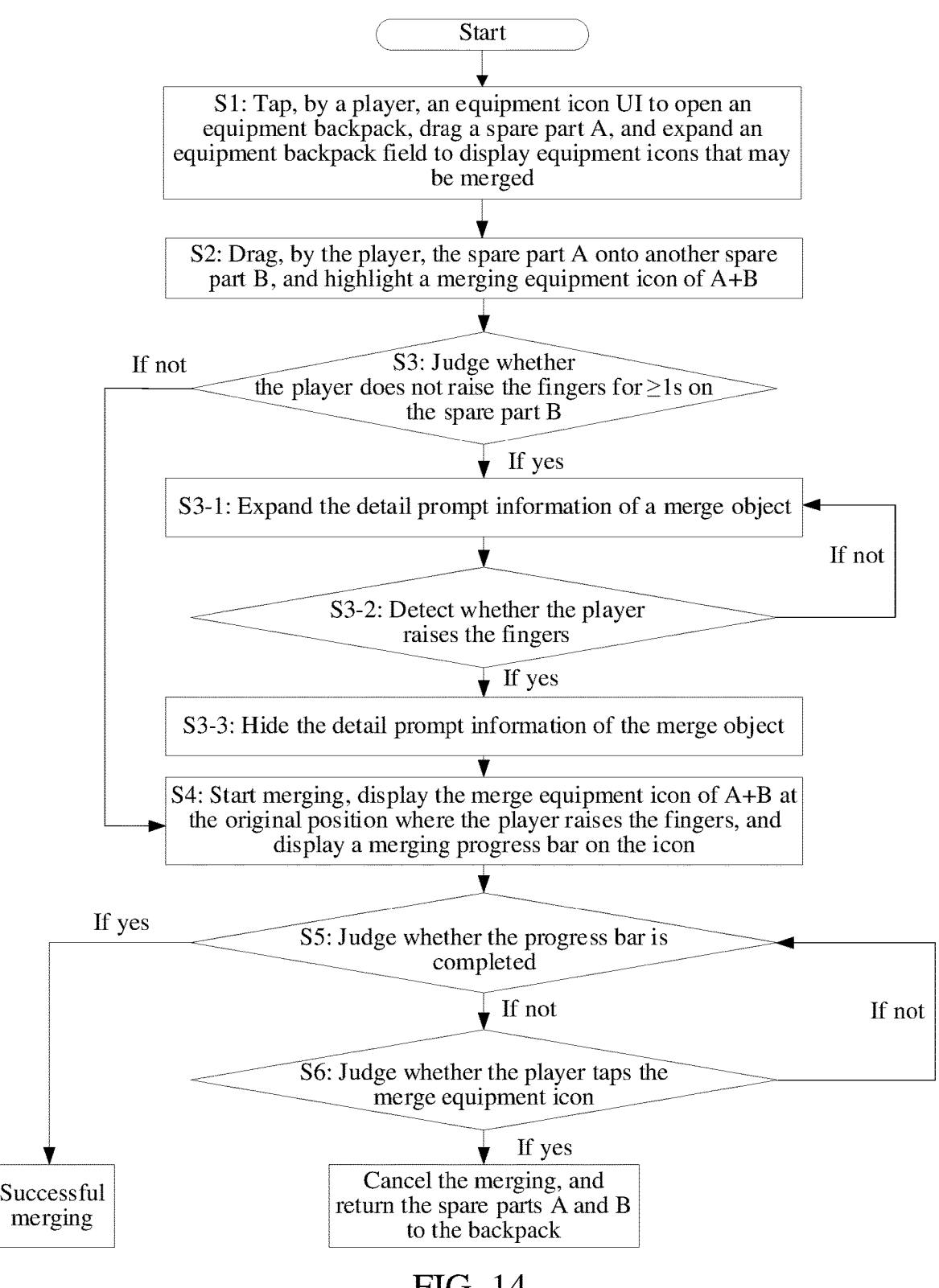
FIG. 14 is a flowchart of another example prop generation method according to an embodiment of the present disclosure.

As shown in FIG. 14, steps in the figure are explained as follows:

S1: Tap, by a player, an equipment icon UI to open an equipment backpack, drag a spare part A, and expand an equipment backpack field to display equipment icons that may be merged.

S2: Drag, by the player, the spare part A onto another spare part B, and highlight a merge equipment icon of A+B.

S3: Judge whether the player does not raise the fingers for ≥1 s on the spare part B, where if "not" (that is, the player raises the fingers within 1 s), it indicates that the player raises the fingers within is, directly perform S4; and if "yes" (that is, the player does not raise the fingers for ≥1 s), perform steps S3-1 to S3-3, expand the detail prompt information of a merge object, at the same time, continuously detect whether the player raises the fingers, keep the interface unchanged before the player raises the fingers, instantly hide the detail prompt information of the merge object after the player raises the fingers, and perform S4.

S4: Start generation, display the merge equipment icon of A+B at the original position where the player raises the fingers, and display a generation progress bar on the icon.

S5: Judge, by a system, whether the progress bar is completed, where if "yes", determine that the generation is successful, and play the corresponding animation effect; and if "not", perform the next judgment.

S6: Judge, by the system, whether the player taps the merge equipment icon, where if "yes", cancel the generation, and return the spare parts A and B to the backpack again; and if "not", return to the previous judgment.

Figure 15:
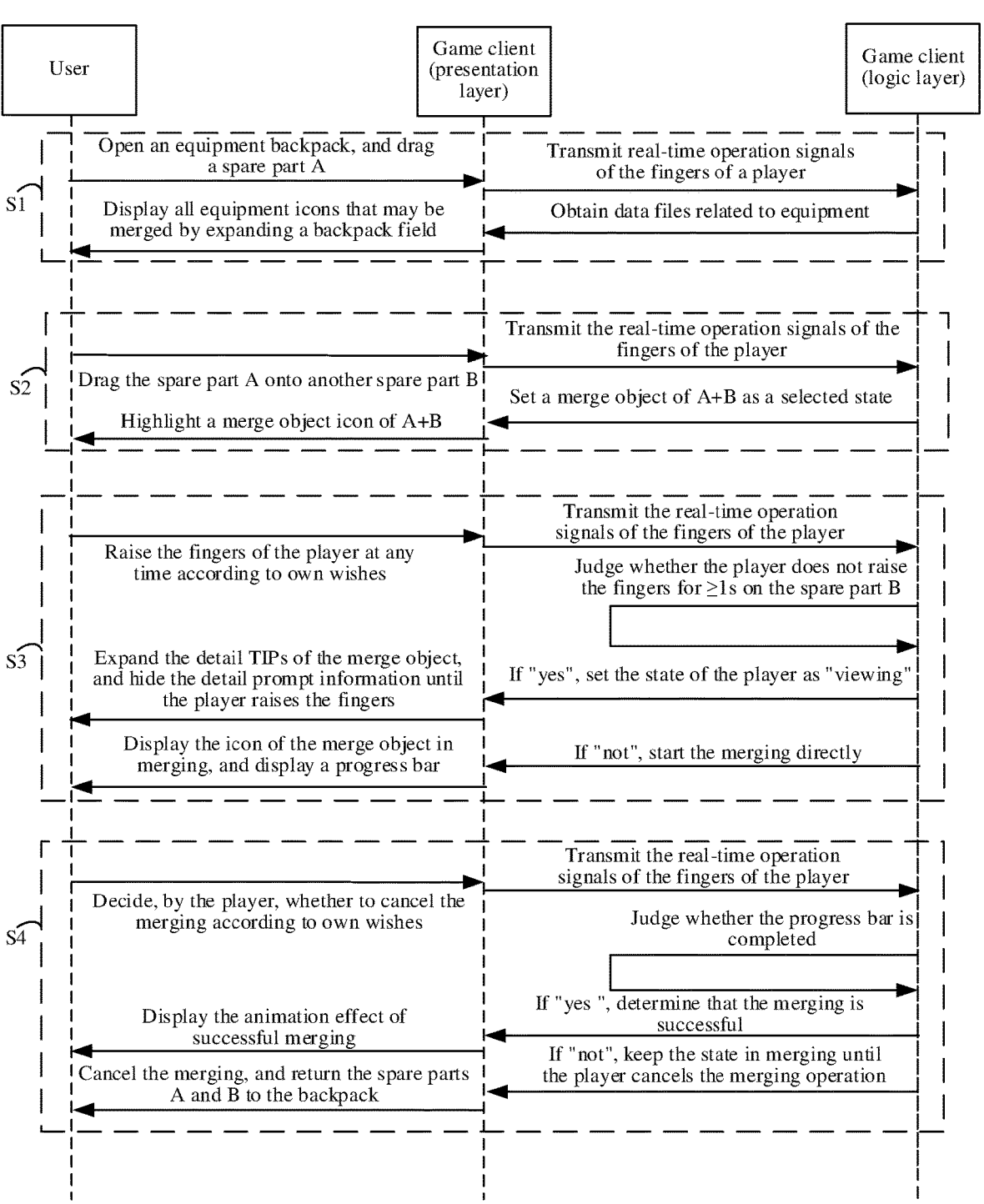
FIG. 15 is a sequence diagram of an example prop generation method according to an embodiment of the present disclosure.

Corresponding to the foregoing method process, a back-end interaction method is shown in FIG. 15:

S1: Open, by a player, an equipment backpack, and drag a spare part A; transmit, by a game client presentation layer (hereinafter referred to as the "presentation layer"), real-time operation signals of the fingers of the player to a game client logic layer (hereinafter referred to as the "logic layer"); and obtain, by the logic layer, data files related to equipment, and control the presentation layer to expand an equipment backpack field to display all equipment icons that may be merged.

S2: Drag, by the player, the spare part A onto another spare part B; transmit, by the presentation layer, the real-time operation signals of the fingers of the player to the logic layer; and set, by the logic layer, a merge object of A+B as a selected state, and control the presentation layer to highlight a merge equipment icon of A+B.

S3: Raise the fingers of the player at any time according to own wishes; transmit, by the presentation layer, the real-time operation signals of the fingers of the player to the logic layer, and judge, by the logic layer, whether the player does not raise the fingers for ≥1 s on the spare part B; if "yes", set the state of the player as "viewing", control the presentation layer to expand the generation to open the equipment backpack, drag the detail prompt information of the spare part A, and hide the detail prompt information until the player raises the fingers; and if "not", start the equipment generation directly, control the presentation layer to display a state icon of a merge object in the process of generation, and display a progress bar.

S4: Decide, by the player, whether to cancel the generation according to own wishes, and if the player wants to cancel the generation, tap the generation icon again; transmit, by the presentation layer, the real-time operation signals of the fingers of the player to the logic layer, and judge, by the logic layer, whether the progress bar is completed, where if "yes", determine that the generation is successful and the cancellation is invalid; and if "not", keep the state in generation, cancel the generation until the player cancels the generation and taps the generation icon again, and return the spare parts A and B to the backpack.

Another example embodiment of the present disclosure is described below with reference to FIG. 16 and FIG. 17.

Figure 16:
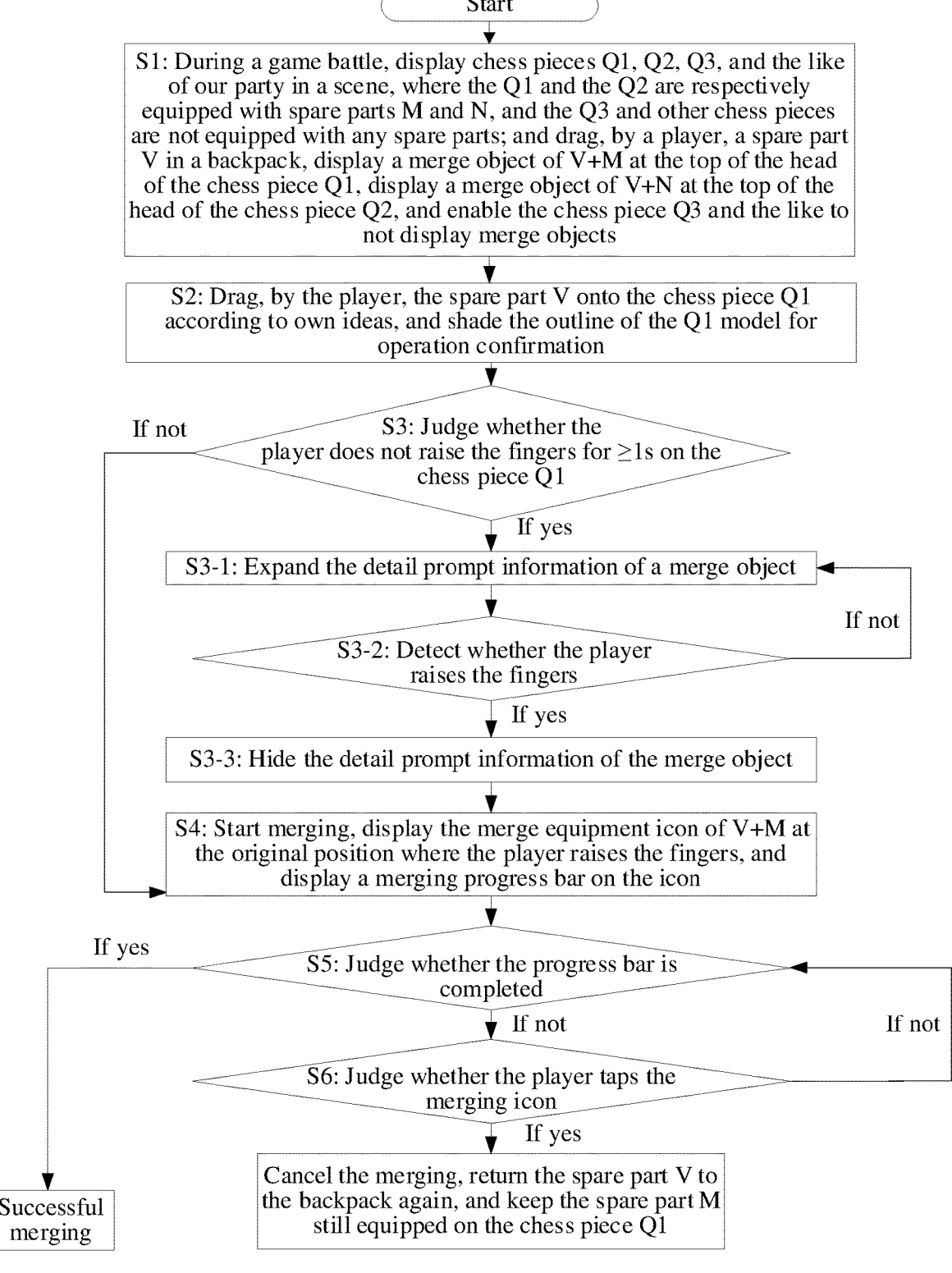
FIG. 16 is a flowchart of another example prop generation method according to an embodiment of the present disclosure.

As shown in FIG. 16, S1: during a game battle, display chess pieces Q1, Q2, Q3, and the like of our party in a scene, where the Q1 and the Q2 are respectively equipped with spare parts M and N, and the Q3 and other chess pieces are not equipped with any spare parts; and drag, by a player, a spare part V in an equipment backpack, display a merge object of V+M at the top of the head of the chess piece Q1, display a merge object of V+N at the top of the head of the chess piece Q2, and enable the chess piece Q3 and the like to not display merge objects.

S2: Drag, by the player, the spare part V onto the chess piece Q1 according to own ideas, and shade the outline of the Q1 model for operation confirmation.

S3: Judge, by a system, whether the player does not raise the fingers for ≥1 s on the chess piece Q1, where if "not", it indicates that the player raises the fingers within 1 s, directly perform S4; and if "yes", perform steps S3-1 to S3-3, that is, expand the detail Tips of a merge object, at the same time, continuously detect whether the player raises the fingers, keep the interface unchanged before the player raises the fingers, instantly hide the detail prompt information of the merge object after the player raises the fingers, and perform S4.

S4: Start generation, display the merge equipment icon of V+M at the original position where the player raises the fingers, and display a generation progress bar on the icon.

S5: Judge, by the system, whether the progress bar is completed, where if "yes", determine that the generation is successful, and play the corresponding animation effect; and if "not", perform the next judgment.

S6: Judge, by the system, whether the player taps the generation icon, where if "yes", cancel the generation, return the spare part V to the backpack again, and keep the spare part M still equipped on the chess piece Q1; and if "not", return to the previous judgment.

Figure 17:
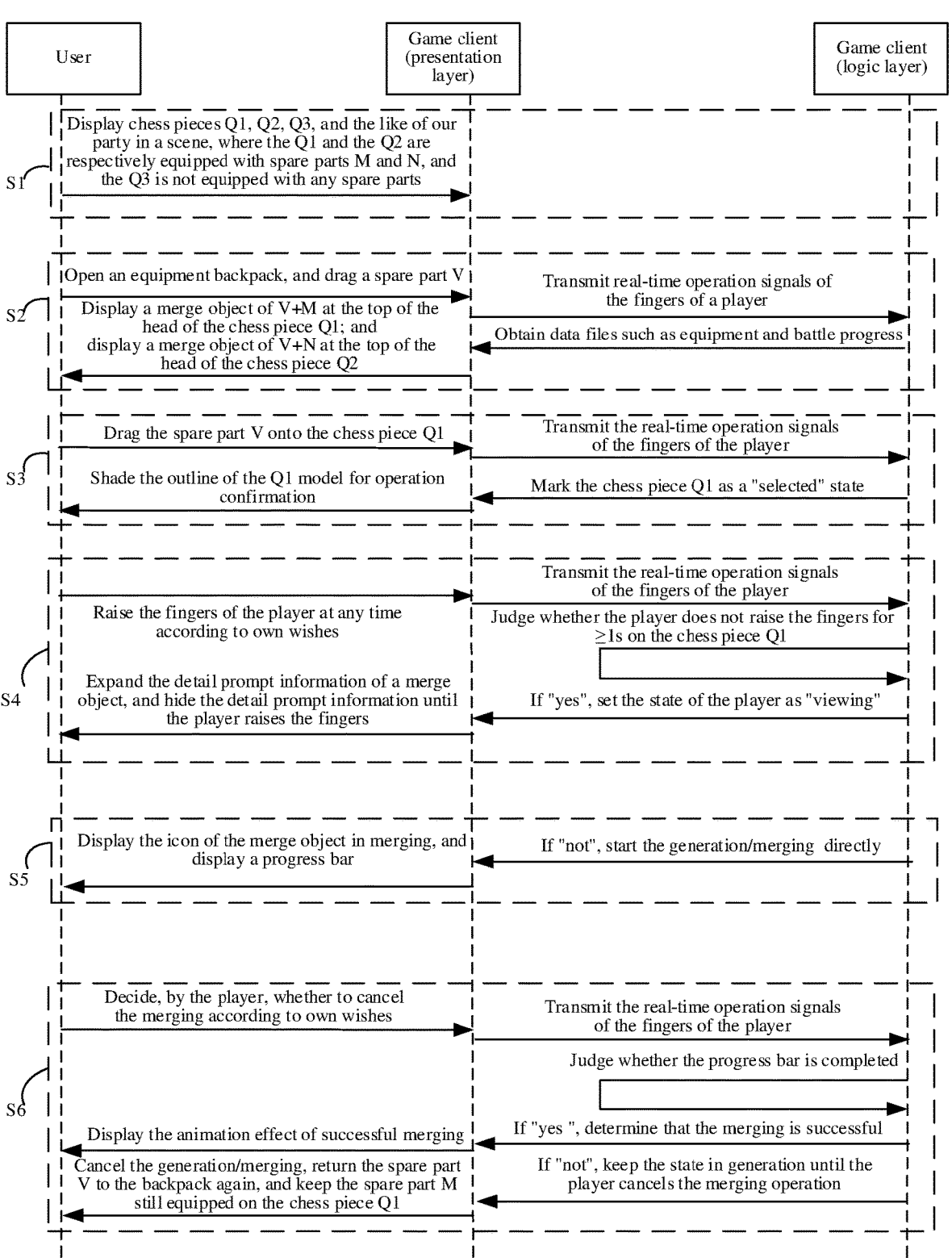
FIG. 17 is a sequence diagram of another example prop generation method according to an embodiment of the present disclosure.

Correspondingly, as shown in FIG. 17, the specific recognition and detection processes for each round (generation on chess pieces) are as follows:

S1: During a game battle, control, by a presentation layer, a scene to display chess pieces Q1, Q2, Q3, and the like of our party, where the Q1 and the Q2 are respectively equipped with spare parts M and N, and the Q3 and other chess pieces are not equipped with any spare parts.

S2: Open, by a player, an equipment backpack, drag a spare part V, and transmit, by the presentation layer, real-time operation signals of the fingers of the player to a logic layer; and obtain, by the logic layer, data such as equipment and real-time battle progress, and control the presentation layer to display a merge object of V+M at the top of the head of the chess piece Q1 and display a merge object of V+N at the top of the head of the chess piece Q2, where since other chess pieces are not equipped with spare parts, generation may not be performed, and merge objects are not displayed.

S3: Drag, by the player, the spare part V onto the chess piece Q1 according to own ideas; transmit, by the presentation layer, the real-time operation signals of the fingers of the player to the logic layer; and mark, by the logic layer, the chess piece Q1 as a "selected" state, and control the presentation layer to shade the outline of the Q1 model for operation confirmation.

S4: Raise the fingers of the player at any time according to own wishes, and transmit, by the presentation layer, the real-time operation signals of the fingers of the player to the logic layer; judge, by the logic layer, whether the player does not raise the fingers for ≥1 s on the chess piece Q1, where if "not", it indicates that the player raises the fingers within 1 s, directly perform S5; and if "yes", expand the detail prompt information of a merge object, at the same time, continuously detect whether the player raises the fingers, keep the interface unchanged before the player raises the fingers, instantly hide the detail prompt information after the player raises the fingers, and perform S5.

S5: Start generation, display the equipment icon of V+M in generation at the original position where the player raises the fingers, and display a progress bar on the icon.

S6: Decide, by the player, whether to cancel the generation according to own wishes, and if the player wants to cancel the generation, tap the generation icon again; transmit, by the presentation layer, the real-time operation signals of the fingers of the player to the logic layer, and judge, by the logic layer, whether the progress bar is completed, where if "yes", determine that the generation is successful and the cancellation is invalid, and play the corresponding animation effect; and if "not", keep the state in generation, tap the generation icon again until the player wants to cancel the generation to cancel the generation, return the spare part V to the backpack again, and keep the spare part M still equipped on the chess piece Q1.

In this embodiment of the present disclosure, by the method including the steps of displaying a prop list of a target account in a display interface displaying a virtual game scene, where the prop list includes prop icons of props obtained by the target account; displaying a preview prop icon of a merge prop matched with the first prop in a preview state in response to a drag operation performed on a prop icon of a first prop in the prop list, where the merge prop is a prop obtained by merging the first prop with a second prop in a candidate merging state; determining a target merge prop matched with an operation trajectory endpoint of the drag operation, and displaying generation progress information for merging the target merge prop; and canceling the generation of the target merge prop in response to a cancel operation triggered for the generation progress information and that the generation progress information indicates that the generation is not completed, a merge prop may be displayed in a preview mode, and a control method for canceling generation is provided to avoid the situation that a user cannot cancel the generation due to incorrect operations resulting in incorrect generation, thereby solving the technical problem of low fault tolerance rate in existing prop generation methods.

It is to be understood that to simplify the description, the foregoing method embodiments are described as a series of action combination. But a person of ordinary skill in the art needs to know that the present disclosure is not limited to any described sequence of the action, as some steps can adopt other sequences or can be executed simultaneously according to the present disclosure. Secondly, a person of ordinary skill in the art also needs to know that all embodiments described in the specification are preferred embodiments, and the related actions and modules are not necessarily mandatory to the present disclosure.

Figure 18:
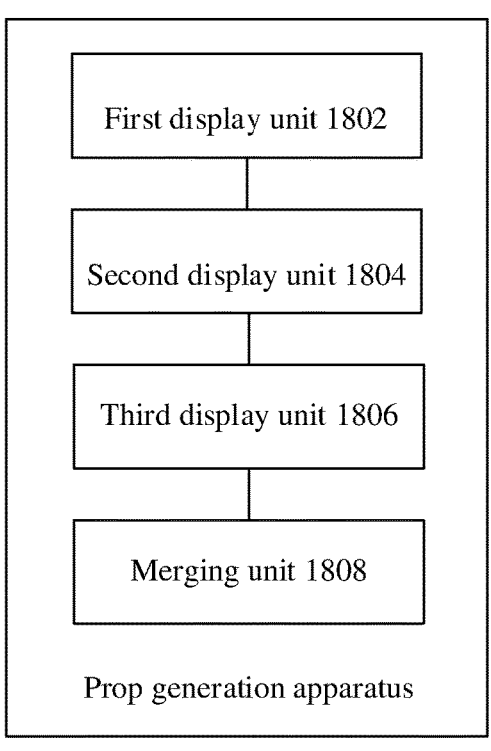
FIG. 18 is a schematic structural diagram of an example prop generation apparatus according to an embodiment of the present disclosure.

According to another aspect of an embodiment of the present disclosure, a prop generation apparatus for implementing the foregoing prop generation method is further provided. As shown in FIG. 18, the apparatus includes:

a first display unit 1802, configured to display a prop list of a target account in a display interface displaying a virtual game scene, where the prop list includes prop icons of props obtained by the target account;

a second display unit 1804, configured to display a preview prop icon of a merge prop matched with the first prop in a preview state in response to a drag operation performed on a prop icon of a first prop in the prop list, where the merge prop is a prop obtained by merging the first prop with a second prop in a candidate merging state;

a third display unit 1806, configured to determine a target merge prop matched with an operation trajectory endpoint of the drag operation, and display generation progress information for merging the target merge prop; and a merging unit 1808, configured to cancel the generation of the target merge prop in response to a cancel operation triggered for the generation progress information and that the generation progress information indicates that the generation is not completed.

In an embodiment, the third display unit 1806 is further configured to determine that the focus position of the touch focus is located on an operation trajectory of the drag operation in response to that a touch focus of the drag operation is detected; determine that the disappearance position of the touch focus is the operation trajectory endpoint of the drag operation in response to detecting that the touch focus on the operation trajectory disappears, and determine a merge prop corresponding to the second prop that overlaps with the operation trajectory endpoint as the target merge prop; and display a prop icon of the target merge prop, and display the generation progress information on the prop icon of the target merge prop.

In an embodiment, the apparatus further includes: a generation canceling unit, configured to determine to trigger the cancel operation in response to a tap operation performed on the prop icon of the target merge prop and that the generation progress information indicates that the generation is not completed; and cancel the generation of the target merge prop, and restore and store the first prop and the second prop for merging the target merge prop to original positions.

In an embodiment, the generation canceling unit is further configured to redisplay the prop icon of the second prop for merging the target merge prop in the prop list in response to that the second prop for merging the target merge prop is a prop in the prop list of the target account; and reequip the second prop for merging the target merge prop on the target virtual character in response to that the second prop for merging the target merge prop is a prop equipped by a target virtual character in the virtual game scene.

In an embodiment, the third display unit 1806 is further configured to display prop description information corresponding to the target merge prop in response to determining that the focus position of the touch focus is located on the operation trajectory of the drag operation and the dwell duration of the touch focus at the focus position is greater than the target duration; and hide the prop description information corresponding to the displayed target merge prop in response to determining that the disappearance position of the touch focus is the operation trajectory endpoint of the drag operation.

In an embodiment, the third display unit 1806 is further configured to display animation prompt information of the target merge prop in response to that the generation progress information indicates that the generation is completed.

In an embodiment, the second display unit 1804 is further configured to display the preview prop icon of the merge prop matched with the second prop in the prop list in response to the drag operation performed on the prop icon of the first prop, where the prop allowed to be merged with the first prop in the prop list is determined as the second prop in the candidate merging state, the prop icon of the first prop and the prop icon of the second prop have a same display style, and the preview prop icon of the merge prop and the prop icon of the first prop have different display styles; and determine the merge prop matched with the first target prop as the target merge prop in response to that the operation trajectory endpoint of the drag operation overlaps with a first target prop in the second props in the candidate merging state.

In an embodiment, the second display unit 1804 is further configured to display the preview prop icon of the merge prop matched with the second prop equipped by the virtual character in a prompt region corresponding to each virtual character in the virtual game scene in response to the drag operation performed on the prop icon of the first prop, where the prop equipped by the virtual character, allowed to be merged with the first prop, is determined as the second prop in the candidate merging state; and determine the second prop equipped by the reference virtual character as a second target prop in response to that the operation trajectory endpoint of the drag operation overlaps with a reference virtual character, and determine the merge prop matched with the second target prop as the target merge prop.

In an embodiment, the third display unit 1806 is further configured to display the generation progress information on the prop icon of the target merge prop in one of the following modes: displaying a circular progress bar matched with the generation progress information on the prop icon of the target merge prop; displaying a sector-shaped highlighted region matched with the generation progress information on the prop icon of the target merge prop; displaying a generation progress percentage matched with the generation progress information on the prop icon of the target merge prop; and displaying a countdown of the completion of generation of the target merge prop, matched with the generation progress information, on the prop icon of the target merge prop.

Figure 19:
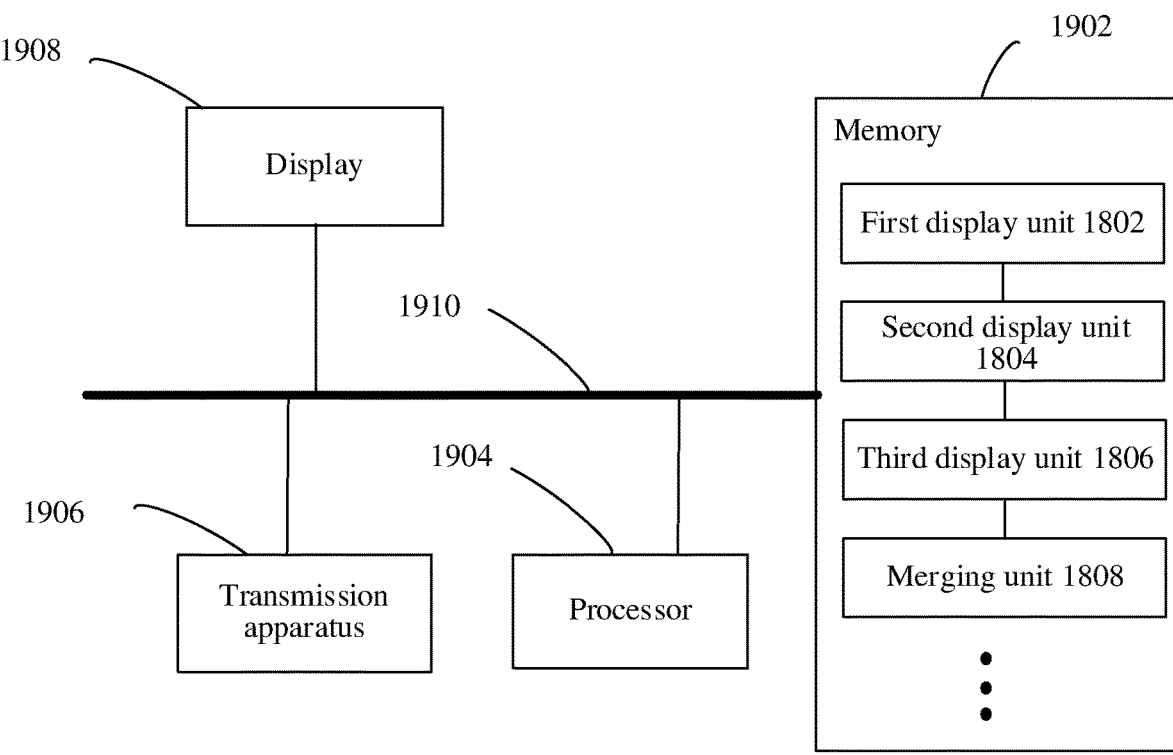
FIG. 19 is a schematic structural diagram of an example electronic device according to an embodiment of the present disclosure.

According to another aspect of an embodiment of the present disclosure, an electronic device for implementing the foregoing prop generation method is further provided. The electronic device may be a terminal device or a server shown in FIG. 19. This embodiment takes the electronic device which is the terminal device as an example for illustration. As shown in FIG. 19, the electronic device includes a memory 1902 and a processor 1904, where the memory 1902 stores a computer-readable instruction, and the processor 1904 is configured to perform the steps in any one of the foregoing method embodiments through the computer-readable instruction.

In some embodiments, the foregoing electronic device may be located in at least one of multiple network devices in a computer network.

In some embodiments, the foregoing processor may be configured to perform the following steps through the computer-readable instruction:

S1: Display a prop list of a target account in a display interface displaying a virtual game scene, where the prop list includes prop icons of props obtained by the target account.

S2: Display a preview prop icon of a merge prop matched with the first prop in a preview state in response to a drag operation performed on a prop icon of a first prop in the prop list, where the merge prop is a prop obtained by merging the first prop with a second prop in a candidate merging state.

S3: Determine a target merge prop matched with an operation trajectory endpoint of the drag operation, and display generation progress information for merging the target merge prop.

S4: Cancel the generation of the target merge prop in response to a cancel operation triggered for the generation progress information and that the generation progress information indicates that the generation is not completed.

In some embodiments, the foregoing processor may further be configured to perform the following steps through the computer-readable instruction:

S1: Display a prop list of a target account in a display interface displaying a virtual game scene, where the prop list includes prop icons of props obtained by the target account.

S2: Display a preview prop icon of a merge prop matched with the first prop in a preview state in response to a drag operation performed on a prop icon of a first prop in the prop list, where the merge prop is a prop obtained by merging the first prop with a second prop in a candidate merging state.

S3: Determine a target merge prop matched with an operation trajectory endpoint of the drag operation, and display generation progress information for merging the target merge prop.

S4: Cancel the generation of the target merge prop in response to a cancel operation triggered for the generation progress information and that the generation progress information indicates that the generation is not completed.

In some embodiments, a person of ordinary skill in the art may understand that the structure shown in FIG. 19 is only schematic. The electronic device may be a terminal device such as a smart phone (such as an Android mobile phone or an iOS mobile phone), a tablet computer, a palmtop computer, a mobile Internet device (MID), or a PAD. FIG. 19 does not limit the structure of the foregoing electronic device. For example, the electronic device may further include more or less components (such as a network interface) than those shown in FIG. 19, or has a configuration different from that shown in FIG. 19.

The memory 1902 may be configured to store a software program and a module, for example, a program instruction/module corresponding to a prop generation method and a prop generation apparatus in the embodiments of the present disclosure, and the processor 1904 performs various functional applications and data processing by running a software program and a module stored in the memory 1902, thus implementing the foregoing prop generation method. The memory 1902 may include a high-speed random access memory (RAM), and may also include a non-volatile memory, for example, one or more magnetic storage apparatuses, a flash memory, or another non-volatile solid-state memory. In some embodiments, the memory 1902 may further include memories remotely disposed relative to the processor 1904, and the remote memories may be connected to a terminal through a network. Examples of the foregoing network include, but are not limited to, the Internet, an intranet, a local area network, a mobile communication network, and a combination thereof. The memory 1902 may be specifically used for, but is not limited to, storage of information such as various elements and prop merge information in a scene picture. As an example, as shown in FIG. 19, the memory 1902 may include, but is not limited to, the first display unit 1802, the second display unit 1804, the third display unit 1806 and the merging unit 1808 in the foregoing prop generation apparatus. In addition, the memory 1902 may further include, but is not limited to, other module units in the foregoing prop generation apparatus, which will not be described again in this example.

In some embodiments, a transmission apparatus 1906 is configured to receive or send data through a network. Specific examples of the foregoing network may include a wired network and a wireless network. In an example, the transmission apparatus 1906 includes a network interface controller (NIC). The NIC may be connected to another network device and a router by network cables, so as to communicate with the Internet or a local area network. In an example, the transmission apparatus 1906 is a radio frequency (RF) module, which communicates with the Internet in a wireless manner.

In addition, the foregoing electronic device further includes: a display 1908, configured to display a virtual scene in an interface; and a connecting bus 1910, configured to connect each module component in the foregoing electronic device.

In other embodiments, the foregoing terminal device or server may be a node in a distributed system, where the distributed system may be a blockchain system, and the blockchain system may be a distributed system formed by connecting multiple nodes through network communication. A peer to peer (P2P) network may be formed between nodes, and any form of computing devices, such as servers, terminals, and other electronic devices, may become a node in the blockchain system by joining the P2P network.

According to one aspect of the present disclosure, a computer program product or a computer program is provided. The computer program product or the computer program includes a computer-readable instruction, and the computer-readable instruction contains a program code for performing the method shown in a flowchart. In such an embodiment, the computer program may be downloaded and installed from a network through a communication part, and/or installed from a removable medium. When the computer program is executed by a central processing unit (CPU), various functions provided in the embodiment of the present disclosure are executed.

The sequence numbers of the foregoing embodiments of the present disclosure are merely for description purpose but do not imply the preference among the embodiments.

According to one aspect of the present disclosure, a computer-readable storage medium is provided. A processor of an electronic device reads the computer instruction from the computer-readable storage medium, and the processor executes the computer instruction to cause the electronic device to perform the foregoing prop generation method.

In some embodiments, the foregoing computer-readable storage medium may further be configured to store a computer-readable instruction for executing the following steps:

S1: Display a prop list of a target account in a display interface displaying a virtual game scene, where the prop list includes prop icons of props obtained by the target account.

S2: Display a preview prop icon of a merge prop matched with the first prop in a preview state in response to a drag operation performed on a prop icon of a first prop in the prop list, where the merge prop is a prop obtained by merging the first prop with a second prop in a candidate merging state.

S3: Determine a target merge prop matched with an operation trajectory endpoint of the drag operation, and display generation progress information for merging the target merge prop.

S4: Cancel the generation of the target merge prop in response to a cancel operation triggered for the generation progress information and that the generation progress information indicates that the generation is not completed.

In some embodiments, a person of ordinary skill in the art can understand that all or some steps in the methods in the foregoing embodiments may be performed by a program instructing related hardware of a terminal device. The program may be stored in a computer-readable storage medium. The storage medium may include: a flash disk, a read-only memory (ROM), a random access memory (RAM), a magnetic disk, an optical disk, and the like.

When the integrated unit in the foregoing embodiments is implemented in a form of a software functional unit and sold or used as an independent product, the integrated unit may be stored in the foregoing computer-readable storage medium. Based on such an understanding, the technical solutions of the present disclosure essentially, or a part contributing to the related art, or all or a part of the technical solution may be implemented in a form of a software product. The computer software product is stored in a storage medium and includes several instructions for instructing one or more electronic devices (which may be a personal computer (PC), a server, a network device or the like) to perform all or some of steps of the methods in the embodiments of the present disclosure.

In the foregoing embodiments of the present disclosure, the descriptions of the embodiments have respective focuses. For a part that is not described in detail in an embodiment, reference may be made to related descriptions in other embodiments.

In the several embodiments provided in the present disclosure, it is to be understood that the disclosed client may be implemented in another manner. The apparatus embodiment described above is merely exemplary. For example, the unit division is merely logical function division and may be other division in an actual implementation. For example, multiple units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separated, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in the form of a software functional unit.

The foregoing descriptions are merely exemplary implementations of the present disclosure. A person of ordinary skill in the art may further make several improvements and modifications without departing from the principle of the present disclosure, and the improvements and modifications also fall within the protection scope of the present disclosure.

What is claimed is:

1. A prop generation method performed by an electronic device, comprising:

displaying a prop list of a target account in a display interface displaying a virtual game scene, wherein the prop list comprises prop icons of props obtained by the target account;

displaying a preview prop icon of a merge prop matched with the first prop in a preview state in response to a drag operation performed on a prop icon of a first prop in the prop list, wherein the merge prop is a prop obtained by merging the first prop with a second prop in a candidate merging state;

determining a target merge prop matched with an operation trajectory endpoint of the drag operation, and displaying generation progress information for merging the target merge prop; and canceling generation of the target merge prop in response to a cancel operation triggered for the generation progress information and that the generation progress information indicates that the generation is not completed.

2. The method according to claim 1, wherein the determining a target merge prop matched with an operation trajectory endpoint of the drag operation, and displaying generation progress information for merging the target merge prop comprises:

determining that a focus position of a touch focus is located on an operation trajectory of the drag operation in response to that the touch focus of the drag operation is detected;

determining that a disappearance position of the touch focus is the operation trajectory endpoint of the drag operation in response to detecting that the touch focus on the operation trajectory disappears, and determining a merge prop corresponding to the second prop that overlaps with the operation trajectory endpoint as the target merge prop; and displaying a prop icon of the target merge prop, and displaying the generation progress information on the prop icon of the target merge prop.

3. The method according to claim 2, wherein the canceling the generation of the target merge prop in response to a cancel operation triggered for the generation progress information and that the generation progress information indicates that the generation is not completed comprises:

determining to trigger the cancel operation in response to a tap operation performed on the prop icon of the target merge prop in response to that the generation progress information indicates that the generation is not completed; and canceling the generation of the target merge prop, and restoring and storing the first prop and the second prop for merging the target merge prop to original positions.

4. The method according to claim 3, wherein the restoring and storing the first prop and the second prop for merging the target merge prop to original positions comprises:

redisplaying the prop icon of the second prop for merging the target merge prop in the prop list in response to that the second prop for merging the target merge prop is a prop in the prop list of the target account; and reequipping the second prop for merging the target merge prop on a target virtual character in response to that the second prop for merging the target merge prop is a prop equipped by the target virtual character in the virtual game scene.

5. The method according to claim 2, wherein the method further comprises:

displaying prop description information corresponding to the target merge prop in response to determining that the focus position of the touch focus is located on the operation trajectory of the drag operation and the dwell duration of the touch focus at the focus position is greater than the target duration; and hiding the prop description information corresponding to the displayed target merge prop in response to determining that the disappearance position of the touch focus is the operation trajectory endpoint of the drag operation.

6. The method according to claim 1, further comprising:

displaying animation prompt information of the target merge prop in response to that the generation progress information indicates that the generation is completed, the animation prompt information comprising an animation of the target merge prop indicating a completion of the generation.

7. The method according to claim 1, wherein the displaying a preview prop icon of a merge prop matched with the first prop in a preview state in response to a drag operation performed on a prop icon of a first prop in the prop list comprises:

displaying the preview prop icon of the merge prop matched with the second prop in the prop list in response to the drag operation performed on the prop icon of the first prop, wherein the prop allowed to be merged with the first prop in the prop list is determined as the second prop in the candidate merging state, the prop icons of the first prop and the second prop have a same display style, and a display style of the preview prop icon of the merge prop is different from the display style of the prop icons of the first prop and the second prop; and determining the merge prop matched with the first target prop as the target merge prop in response to that the operation trajectory endpoint of the drag operation overlaps with a first target prop in the second props in the candidate merging state.

8. The method according to claim 1, wherein the displaying a preview prop icon of a merge prop matched with the first prop in a preview state in response to a drag operation performed on a prop icon of a first prop in the prop list comprises:

displaying the preview prop icon of the merge prop matched with the second prop equipped by a virtual character in a prompt region corresponding to the virtual character in the virtual game scene in response to the drag operation performed on the prop icon of the first prop, wherein the prop equipped by the virtual character, allowed to be merged with the first prop, is determined as the second prop in the candidate merging state; and determining the second prop equipped by a reference virtual character as a second target prop in response to that the operation trajectory endpoint of the drag operation overlaps with the reference virtual character, and determining the merge prop matched with the second target prop as the target merge prop.

9. The method according to claim 1, wherein the displaying the generation progress information on the prop icon of the target merge prop comprises one of the following:

displaying a circular progress bar matched with the generation progress information on the prop icon of the target merge prop;

displaying a sector-shaped highlighted region matched with the generation progress information on the prop icon of the target merge prop;

displaying a generation progress percentage matched with the generation progress information on the prop icon of the target merge prop; and displaying a countdown of the completion of generation of the target merge prop, matched with the generation progress information, on the prop icon of the target merge prop.

10. A prop generation apparatus, comprising:

at least one memory and at least one processor, wherein the at least one memory stores a computer-readable instruction, and the at least one processor is configured, when executing the computer-readable instruction, to:

display a prop list of a target account in a display interface
displaying a virtual game scene, wherein the prop list
comprises prop icons of props obtained by the target
account;

display a preview prop icon of a merge prop matched with
the first prop in a preview state in response to a drag
operation performed on a prop icon of a first prop in the
prop list, wherein the merge prop is a prop obtained by
merging the first prop with a second prop in a candidate
merging state;

determine a target merge prop matched with an operation
trajectory endpoint of the drag operation, and display
generation progress information for merging the target
merge prop; and cancel generation of the target merge prop in response to
a cancel operation triggered for the generation progress
information and that the generation progress informa-
tion indicates that the generation is not completed.

11. The apparatus according to claim 10, wherein the at
least one processor is further configured to:

determine that a focus position of a touch focus is located
on an operation trajectory of the drag operation in
response to that the touch focus of the drag operation is
detected;

determine that a disappearance position of the touch focus
is the operation trajectory endpoint of the drag opera-
tion in response to detecting that the touch focus on the
operation trajectory disappears, and determine a merge
prop corresponding to the second prop that overlaps
with the operation trajectory endpoint as the target
merge prop; and display a prop icon of the target merge prop, and display
the generation progress information on the prop icon of
the target merge prop.

12. The apparatus according to claim 11, wherein the at
least one processor is further configured to:

determine to trigger the cancel operation in response to a
tap operation performed on the prop icon of the target
merge prop and that the generation progress informa-
tion indicates that the generation is not completed; and cancel the generation of the target merge prop, and restore
and store the first prop and the second prop for merging
the target merge prop to original positions.

13. The apparatus according to claim 12, wherein the at
least one processor is further configured to:

redisplay the prop icon of the second prop for merging the
target merge prop in the prop list in response to that the
second prop for merging the target merge prop is a prop
in the prop list of the target account; and reequip the second prop for merging the target merge prop
on the target virtual character in response to that the
second prop for merging the target merge prop is a prop
equipped by a target virtual character in the virtual
game scene.

14. The apparatus according to claim 11, wherein the at
least one processor is further configured to:

display prop description information corresponding to the
target merge prop in response to determining that the
focus position of the touch focus is located on the
operation trajectory of the drag operation and the dwell
duration of the touch focus at the focus position is
greater than the target duration; and hide the prop description information corresponding to
the displayed target merge prop in response to deter-
mining that the disappearance position of the touch
focus is the operation trajectory endpoint of the drag
operation.

15. The apparatus according to claim 10, wherein the at
least one processor is further configured to:

display animation prompt information of the target merge
prop in response to that the generation progress infor-
mation indicates that the generation is completed, the
animation prompt information comprising an anima-
tion of the target merge prop indicating a completion of
the generation.

16. The apparatus according to claim 10, wherein the at
least one processor is further configured to:

display the preview prop icon of the merge prop matched
with the second prop in the prop list in response to the
drag operation performed on the prop icon of the first
prop, wherein the prop allowed to be merged with the
first prop in the prop list is determined as the second
prop in the candidate merging state, the prop icons of
the first prop and the second prop have a same display
style, and a display style of the preview prop icon of the
merge prop is different from the display style of the
prop icons of the first prop and the second prop; and determine the merge prop matched with the first target
prop as the target merge prop in response to that the
operation trajectory endpoint of the drag operation
overlaps with a first target prop in the second props in
the candidate merging state.

17. The apparatus according to claim 10, wherein the at
least one processor is further configured to:

display the preview prop icon of the merge prop matched
with the second prop equipped by the virtual character
in a prompt region corresponding to each virtual char-
acter in the virtual game scene in response to the drag
operation performed on the prop icon of the first prop,
wherein the prop equipped by the virtual character,
allowed to be merged with the first prop, is determined
as the second prop in the candidate merging state; and determine the second prop equipped by the reference
virtual character as a second target prop in response to
that the operation trajectory endpoint of the drag opera-
tion overlaps with a reference virtual character, and
determine the merge prop matched with the second
target prop as the target merge prop.

18. A non-transitory computer-readable storage medium
comprising a computer-readable instruction, wherein the
computer-readable instruction is executed by at least one
processor to implement:

displaying a prop list of a target account in a display
interface displaying a virtual game scene, wherein the
prop list comprises prop icons of props obtained by the
target account;

displaying a preview prop icon of a merge prop matched
with the first prop in a preview state in response to a
drag operation performed on a prop icon of a first prop
in the prop list, wherein the merge prop is a prop
obtained by merging the first prop with a second prop
in a candidate merging state;

determining a target merge prop matched with an opera-
tion trajectory endpoint of the drag operation, and
displaying generation progress information for merging
the target merge prop; and canceling generation of the target merge prop in response
to a cancel operation triggered for the generation prog-
ress information and that the generation progress infor-
mation indicates that the generation is not completed.

19. The storage medium according to claim 18, wherein
the determining a target merge prop matched with an operation trajectory endpoint of the drag operation, and displaying generation progress information for merging the target merge prop comprises:

determining that a focus position of a touch focus is located on an operation trajectory of the drag operation in response to that the touch focus of the drag operation is detected;

determining that a disappearance position of the touch focus is the operation trajectory endpoint of the drag operation in response to detecting that the touch focus on the operation trajectory disappears, and determining a merge prop corresponding to the second prop that overlaps with the operation trajectory endpoint as the target merge prop; and displaying a prop icon of the target merge prop, and displaying the generation progress information on the prop icon of the target merge prop.

20. The storage medium according to claim 19, wherein the canceling the generation of the target merge prop in response to a cancel operation triggered for the generation progress information and that the generation progress information indicates that the generation is not completed comprises:

determining to trigger the cancel operation in response to a tap operation performed on the prop icon of the target merge prop in response to that the generation progress information indicates that the generation is not completed; and canceling the generation of the target merge prop, and restoring and storing the first prop and the second prop for merging the target merge prop to original positions.

\* \* \* \* \*